(12) United States Patent
Nako et al.

(10) Patent No.: US 6,292,593 B1
(45) Date of Patent: Sep. 18, 2001

(54) IMAGE SYNTHESIZING DEVICE AND METHOD

(75) Inventors: Kazuyuki Nako; Mitsuaki Nakamura; Masashi Hirosawa, all of Tenri; Hiroshi Akagi, Nara; Yoshihiro Kitamura, Osaka, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/269,031

(22) PCT Filed: Mar. 27, 1997

(86) PCT No.: PCT/JP97/01028

§ 371 Date: Mar. 18, 1999

§ 102(e) Date: Mar. 18, 1999

(87) PCT Pub. No.: WO98/12866

PCT Pub. Date: Mar. 26, 1998

(30) Foreign Application Priority Data

Sep. 18, 1996 (JP) .................................................... 8-246640

(51) Int. Cl.⁷ ...................................................... G06K 9/36
(52) U.S. Cl. .............................................................. 382/284
(58) Field of Search .................................... 382/173, 276, 382/277, 282, 284, 289, 294, 296, 312, 313; 345/435; 348/239, 584, 599

(56) References Cited

U.S. PATENT DOCUMENTS 5,838,837 * 11/1998 Hirosawa et al. .................... 382/284
6,205,259 * 3/2001 Komiya et al. ....................... 382/284

FOREIGN PATENT DOCUMENTS

| 63-64180 | 3/1988 | (JP) . |
| 3-265367 | 11/1991 | (JP) . |
| 4-336677 | 11/1992 | (JP) . |
| 5-260264 | 10/1993 | (JP) . |
| 7-85246 | 3/1995 | (JP) . |

* cited by examiner

*Primary Examiner*—Leo Boudreau
*Assistant Examiner*—Kanji Patel
(74) *Attorney, Agent, or Firm*—Nixon & Vanderhye, P.C.

(57) ABSTRACT

A one-dimensional image synthesizing unit 3 images an subject, and produces a plurality of image-to-be-combined signals expressing images-to-be-combined having overlapped regions. A central processing unit 5 first obtains matching of images of the subject for each of adjacent images-to-be-combined for all image-to-be-combined signals by center and large block matching processes, and detects the deviations of overlapped regions from the obtained matching. Next, in a small block matching process, on the basis of the deviations of the overlapped regions, a plurality of reference blocks and search regions are made to correspond to each other and are set in the respective overlapped regions, and the deviations of the images of the subject are detected in a unit of each search region in more detail than the deviations detected by the large block matching process. Finally, each of the images-to-be-combined is partially geometrically deformed so as to cancel the deviation of the image of the subject, the reference block and the search block are made coincident with each other, and all image-to-be-combined signals are combined to superimpose the respective images-to-be-combined, so that combined image signals are obtained.

11 Claims, 13 Drawing Sheets

IMAGE SYNTHESIZING DEVICE AND METHOD

TECHNICAL FIELD

The present invention relates to an image synthesizing apparatus and method for obtaining an image which has the number of pixels larger than an image obtained by only one imaging operation using an image pickup device and which has high resolution, or has a wide angle of view and wide range.

BACKGROUND ART

In recent years, in an image synthesizing apparatus used as a so-called scanner, a one-dimensional image pickup device in which light receiving areas are linearly arranged, such as a CCD line sensor, is used. When an output image is obtained by this image synthesizing apparatus, first, while the image pickup device is moved relative to a subject on a two-dimensional plane in the direction perpendicular to the arrangement direction of the light receiving areas, an image of light from the subject is taken at a plurality of different positions. Next, the images obtained in the respective imaging operations are combined on the two-dimensional plane so that they are arranged with the same positional relation as the position of the image pickup device at the respective imaging operations, and the output image is obtained.

In Japanese Unexamined Patent Publication JP-A 5-260264, the present applicant has proposed a technique which uses a two-dimensional image pickup device with light receiving areas arranged in matrix and obtains an output image composed of pixels the number of which is larger than the number of the light receiving areas of the image pickup device. In an image processing apparatus of the publication, an operator of the apparatus takes an image of light while horizontally moving an image input means of a so-called CCD camera so that a plurality of images are obtained. At every time when a new image is obtained, a processing circuit first makes a check on matching of the new image and a combined image, and obtains a difference between these images. Next, on the basis of the obtained difference, a new image is deformed, and finally, the image after deformation and the combined image are combined, so that a new combined image is obtained.

With respect to the image obtained by the two apparatuses described above, as compared with an image directly obtained from an image pickup device, although the number of pixels arranged in the direction along the moving direction of the image pickup device is increased, the number of pixels in the direction orthogonal to the moving direction is not changed. As a technique for increasing the number of pixels in the orthogonal direction of the image, there is a technique in which the plurality of output images are arranged along the orthogonal direction, and are further combined.

Japanese Unexamined Patent Publication JP-A 63-64180 discloses an image synthesizing method of the technique mentioned above. The apparatus of the picture image synthesizing method uses a hand scanner which is provided with a one-dimensional image pickup device and can be manually moved. In the method, first, an original image of an input subject is divided into regions having an appropriate size to read by one scanning using the hand scanner, and image pickup is carried out while the hand scanner is moved along the center axis of the regions in the state that the hand scanner is made to be in contact with the original image, so that images of the respective regions are obtained. The image of each of the regions is equivalent to the output image of the apparatus using the one-dimensional image pickup device, and includes an overlapped region in which the same portion of the original image is read. Next, a check on matching of the overlapped regions of the images in the respective regions is carried out, and regions in the images where images of the subject are coincident with each other are obtained. Finally, superimposition is made after translation of the respective images is carried out to superimpose these images, so that a combined image of a picture image is obtained.

In the picture image synthesizing method described above, since the hand scanner including the image pickup device is manually moved by the operator of the apparatus, at the movement, there is a case where an unintentional movement of the operator's hands is applied to the hand scanner. Moreover, from the same reason, there is a case where the relative position between the image pickup device in the hand scanner and the center axis of the regions of the original image of the input subject is tilted. Moreover, although the hand scanner is provided with a pair of rollers at a portion which is brought into contact with an original image so that the hand scanner smoothly moves on the surface of the original image, when the smoothness of one of the rollers is different from that of the other, there is a case where the moving speed of the hand scanner is different between a portion in the vicinity of one roller and a portion in the vicinity of the other roller.

When these happen, in the image obtained by the apparatus, distortion of an image, such as deviation of an image of the subject and partial compression of the image, occurs. In the image in which such distortion occurred, images of the subject of a plurality of images are not smoothly connected by only the horizontal movement of the images, so that distortion occurs in the image of the subject in the combined image.

In the image processing apparatus of JP-A 5-260264, the image input means takes image light of an subject from a position apart from the subject by a predetermined distant. This image input means is supported by only a hand of an operator of the apparatus and is held in the air, so that the relative position to the subject is apt to be shifted. When the relative position is shifted like this, distortion of an image, such as deviation, tilt, and change in magnification of an image, occurs in the obtained images of the subject in the images-to-be-combined. Although the apparatus combines the images while correcting the distortions of the images of the subject in combining the images, there is a case where the distortion remains since all distortions of the image can not be corrected by, for example, an error in matching and a correction error.

An object of the invention is to provide an image synthesizing apparatus and method capable of obtaining an image in which an image of a subject has a small distortion, and which has high resolution or a wide angle of view and wide range, by using an image pickup device with a small number of light receiving areas.

DISCLOSURE OF THE INVENTION

The present invention provides an image synthesizing apparatus comprising:

image-to-be-combined producing means for producing a plurality of signals of images-to-be-combined, the signals representing the images-to-be-combined including different portions of a subject, the means producing signals so that an image-to-be-combined including a portion of the subject and an adjacent image-to-be-combined including a portion adjacent to said portion of the subject have an overlapped region where a same portion of the subject is imaged in the images-to-be-combined;

first matching means for making a check on matching of the images of the subject in the overlapped region for each set of adjacent images-to-be-combined among the image-to-be-combined signals produced by the image-to-be-combined producing means, and detecting a relative positional deviation between the overlapped regions on the basis of a result of the check on matching;

second matching means for setting a plurality of reference regions of a predetermined size in the overlapped region of one of the images-to-be-combined whose relative positional deviation is detected by the first matching means, for setting a search region larger than the reference region for each of the reference regions in the overlapped region of the other of the images-to-be-combined on the basis of the relative positional deviation, for making a check on matching of the images of the subject between the reference region and the search region corresponding to the reference region, and for detecting a relative positional deviation between the images of the subject on the basis of a result of the check on matching; and image combining means for combining all the image-to-be-combined signals to superimpose the reference region and the search region corresponding to the reference region for each set of adjacent images-to-be-combined while partially deforming the respective images-to-be-combined to cancel the relative positional deviation detected by the second matching means, and producing combined image signals expressing a single combined image with respect to the subject.

According to the invention, the image synthesizing apparatus combines a plurality of images-to-be-combined so that the images of the subject in the overlapped regions are coincident with each other and a single combined image is obtained. The images-to-be-combined are original images imaged by an image pickup apparatus such as a video camera.

This image pickup apparatus takes image light from finite regions of one and the same subject while horizontally and vertically moving the finite region which can be imaged by one imaging operation of the image pickup apparatus, so that the original images to become the images-to-be-combined are obtained. At this time, in the obtained original images, when the positions of the images of a portion of the subject are different, in spite of the fact that the same subject is imaged, there is a case where a difference occurs in the shape of the images of the subject by, for example, distortion of a lens of an optical system of the image pickup apparatus. For example, when the image pickup apparatus is held by a hand of an operator of the image synthesizing apparatus and is moved, the relative distance between the subject and the image pickup apparatus is changed in imaging, so that there is a case where a difference occurs in the size of the images of the subject in the original images. Further, when the image-to-be-combined is a combined image in which the plurality of original images are combined, there is a case where the difference of the images of the subject in the respective original images is accumulated, and the difference becomes large.

In the image combining method of the image synthesizing apparatus, first, a result of the check on matching as an index expressing the deviations of the images of the subject in the overlapped regions of the respective images-to-be-combined is obtained. This result of the check on matching indicates the deviation of position of the images of the subject in the overlapped regions and the degree of deformation of the shape of the images of the subject for every set of adjacent images-to-be-combined, for example. Next, from the obtained result of the check on matching, the relative positional deviation the images of the subject is detected. Finally, in order to correct the detected deviation and deformation, the respective reference regions in the respective overlapped regions and the search regions corresponding thereto are superimposed so that they are coincident with each other, and all the images-to-be-combined are combined while deforming the respective images-to-be-combined.

By this, the difference is corrected, and it is possible to obtain a combined image with a wider angle of view and wider range than the image-to-be-combined or a combined image with high resolution. As a method of canceling the deviation, not only the relative translation of images-to-be-combined of adjacent set but also deformation of images is carried out, so that it is also possible to correct, for example, a change in partial magnification of the image pickup apparatus in producing the images-to-be-combined.

The matching process for detecting the deviation of the subject is carried out in two steps. Specifically, in the first matching process in the first matching means, the deviation of the subject to determine an amount of translation of the overlapped regions is roughly detected. In the second matching process in the second matching means, to determine a deformation amount of deformation of the images, an amount of deviation of the subject is detected in more detail than the first. Thus, the matching process in the first matching means is, for example, a similar process to the second matching means, and the reference region can be set larger than the reference region of the second matching means. By this, an amount of processing of the first matching means can be decreased.

Further, in the matching process operation of the second matching means, on the basis of the detection result of the first matching means, for example, the position where the best matching is obtained in the images-to-be-combined is roughly estimated, and the position of the search region to be searched is set to include that position. Thus, as compared with the case where the search region is set mechanically at random in the image-to-be-combined, even if the size of the search region is made small, the position of the image of the subject to be searched is easily made coincident with the position of the search region. Thus, it is possible to decrease the search region and to decrease the processing amount of the second matching means.

Further, in the invention it is preferable that the first matching means:

firstly, sets a first reference region of a predetermined size at a predetermined position in an overlapping area of one of the set of the adjacent images-to-be-combined, making a check on matching of the images of the subject between the overlapped region of the other image-to-be-combined and the first reference region, and detects a relative positional deviation of the images of the subject on the basis of the obtained matching;

next, sets at least two second reference regions smaller than the first reference region in parallel with the detected deviation direction in the one of the overlapped regions, and sets a second search region smaller than the overlapped region in the overlapped region of the other subject region for each of the second reference regions on the basis of the detected relative positional deviation; and makes a check on matching of the images of the subject between the second search region and the second reference region corresponding to the second search region, and detects the relative positional deviation between the overlapped regions on the basis of an obtained result of the check on matching.

According to the invention, the matching process in the first matching means is carried out in two steps. Although a plurality of images-to-be-combined with respect to an subject are produced by the image-to-be-combined production means, it is difficult to judge in imaging how the relative position of images of the subject in a pair of adjacent images-to-be-combined to be arranged in parallel is shifted. For example, it is difficult to judge in imaging whether, in a pair of images-to-be-combined superimposed and arranged horizontally so that the images of the subject in the overlapped regions are coincident with each other, the upper side of the right image-to-be-combined relatively protrudes to the upper side of the left image-to-be-combined, or whether the upper side of the left image-to-be-combined relatively protrudes to the upper side of the right image-to-be-combined. When this deviation is not known, it become difficult to determine the optimum position in the overlapped regions where the reference region and the search region for detecting the relative positional deviation between the overlapped regions are to be set.

In the first matching means of the invention, first, by using the first reference region, the deviation of the images of the subject between a pair of images-to-be-combined is detected, and on the basis of the detected deviation, places where the second reference region and the second search region can be arranged are determined. Next, the second reference region and the second search region are set at the places where arrangement can be made, and the deviations of the images of the subject between the overlapped regions are obtained. By carrying out the matching process in two steps in this way, even in the case where the state of the deviation of the pair of images-to-be-combined is indefinite, the second reference region and the second search region in the second matching process can be positioned at the optimum place for detecting the relative positional deviation between the overlapped regions.

Since the deviation between the overlapped regions is roughly detected in the first matching process, the search region of the second matching process can be made smaller than the overlapped region. Further, in the second matching process, results of the check on matching are obtained at two places in the overlapped regions, so that not only a parallel deviation between the images of the subjects but also a change in size and a deviation in rotation of the images can be detected.

In the matching process, although the accuracy in matching can be improved as the reference region is made small, a possibility that a point which does not correspond to an image of the subject in the reference region is erroneously regarded as a coincident point in the region to be searched, is increased. Thus, it is possible to prevent the occurrence of error by making the second reference region of the second matching process larger than the first reference region of the first matching process.

Further, in the invention it is preferable that the image synthesizing apparatus further comprises rotation transformation means for obtaining a relative rotation angle between the adjacent images-to-be-combined for each set of the adjacent images-to-be-combined on the basis of the relative positional deviation between the overlapped regions detected by the first matching means, and for making rotation transformation of the image-to-be-combined signals so that the respective images-to-be-combined undergo relative angular displacement in the direction where the obtained relative rotation angle is cancelled; and the second matching means makes a check on matching of the search region for set of the images-to-be-combined in which the relative position is rotatively transformed by the rotation transformation means.

According to the invention, the image synthesizing apparatus previously corrects, by the rotation transformation, only the deviation of rotation movement expressed by the relative rotation angle of the relative positional deviation for each pair of images-to-be-combined after the matching process in the first matching means, and applies the matching process in the second matching means to the corrected images-to-be-combined. By combining the images-to-be-combined in which such rotation correction has been carried out, it is possible to prevent the occurrence of deviation and distortion due to the rotation movement of the images in the combined image and to smoothly connect the images.

In the matching process by the second matching means, basically, it is appropriate that only an amount of translation in the deviations of the images of the subject at a plurality of positions in the overlapped regions is detected. Since the amount of translation is once detected by the first matching means, the process amount of the matching process can be decreased by further decreasing the search region of the matching process of the second matching means. Even in the case where the deviation of rotation movement remains after the rotation transformation, the deviation is minute, so that even if the search region is made small, detection can be made.

Further, in the invention it is preferable that the second matching means gives to the image synthesizing means only a result of the check on matching for the search region in which the image of the subject meets a predetermined index of eligibility as a comparative objective, among results on matching obtained for the respective plurality of search regions.

According to the invention, in the image synthesizing method, among the plurality of results of the check on matching obtained by the second matching means, for example, only a high reliable matching is used for an image deformation process in the image synthesizing means. A high reliable result on matching can be obtained when the image of the subject in the search region to be set meets a predetermined index of eligibility as a comparative objective. As the index of the eligibility as a comparative objective, for example, with reference to the processing method of the matching process, it is preferable to select an index which can be detected quantitatively. By this, it is possible to prevent such a case that a combining process is carried out using an erroneous result on matching and the distortion of images of the subject in the combined image is increased.

Further, in the invention it is preferable that each of the images-to-be-combined is constituted by a plurality of pixels;

the reference region is equal to or larger than a single pixel in size;

the result on matching to the respective search regions is expressed in a position of the search range which is equal to the reference region in size and shape in the respective search regions, and in which a total sum value of pixel values expressing luminance of all pixels in the search range is closest to a total sum of pixel values of the reference region; and it indicates eligibility of the objectives as a comparative objective that a difference value between the total sum value of the pixel values in the search range of the check on matching and the total sum value of the pixel values of the reference region is less than a predetermined reference value.

According to the invention, in the second matching means, a result of the check on matching is obtained by a processing method called a so-called template matching. At this time, a difference value between the total sum value of the pixel values of all pixels in the search range and the total sum value of the pixel values of the reference region shadows eligibility as a comparative objective. When the difference value is not less than a predetermined reference value, although the image of the subject in the search range obtained as a result on matching is closest to the image of the subject in the reference region in the search region, a possibility that it is an image of a portion different from the image of the reference region in the subject becomes high. Thus, it is preferable to remove the matching expressing the position of such search range.

Further, in the invention it is preferable that each of the images-to-be-combined is constituted by a plurality of pixels;

the reference region is equal to or larger than a single pixel in size;

the result of the check on matching to the respective search regions is expressed in a position of a search range which is equal to the reference region in size and shape in the respective search regions, and in which a total sum value of pixel values expressing luminance of all pixels in the search range is closest to a total sum value of pixel values of the reference region; and it indicates eligibly of the objective as a comparative objective that a difference value between a maximum value and a minimum value among pixel values in the search range of the matching is not less than a predetermined reference value.

According to the invention, in the second matching means, a result of the check on matching is obtained by a processing method called a so-called template matching. At this time, the eligibility of the objectives as a comparative objective is indicated by the difference value between the maximum value and the minimum value in the pixel values of all pixels of the search region. When the difference value is less than the predetermined reference value, it is conceivable that the image in the search region is an image with little change in luminance, such as a white image. Even if a plurality of search ranges are set at different places in such a search region, since images in the respective search ranges are almost the same, it becomes difficult to obtain an accurate result of the check on matching. Thus, it is preferable to remove a matching in such a search region.

Further, in the invention it is preferable that it indicates eligibility of the objectives as a comparative objective that in the images of the subject in the search region, portions with the same change in luminance and the same shape are not periodically repeated plural times.

According to the invention, the eligibility of the objectives as a comparative objective is determined in such a manner that an image of the subject having the periodicity is removed. As such an image of the subject, for example, there are enumerated a straight line and a pattern in which a plurality of images with some pattern are arranged. When the image in the search region has such periodicity, images in the plurality of ranges in the plurality of search ranges become equal to each other, so that it becomes difficult to judge which search range in these is the same portion as the image of the subject of the reference region. Thus, it is preferable to remove the matching in such a search region.

Further, in the invention it is preferable that the image-to-be-combined is formed of a plurality of pixels arranged in a matrix form along predetermined one and another direction; and in the geometrical transformation, for each of the images-to-be-combined, a distance between a predetermined transformation reference axis substantially in parallel with the one direction and each of the pixels is enlarged or reduced in the overlapped region, and a mutual distance in a pixel group composed of a plurality of pixels arranged linearly along the other direction is enlarged or reduced, so that a pixel arrangement is transformed.

According to the invention, in the geometrical transformation method of the image synthesizing means, as described above, the transformation reference axis is fixed, and trapezoid transformation is carried out so that, for example, a rectangular image is deformed into a trapezoid image. For example, in the geometrical transformation, when a method in which only the translation of the pixel group is carried out according to the deviation of the image of the subject, is used, the deviation is accumulated, and there is a case where distortion occurs in the image of the subject in the entire of the combined image. This distortion appears especially in the case where not less than three images-to-be-combined are combined. If the trapezoid transformation is carried out, the deviation is cancelled by a unit of pixel group in the respective images-to-be-combined, so that it does not affect other images-to-be-combined. Thus, by the method similar to the translation, the accumulation of deviation can be prevented. Since the deviation is cancelled in units of pixel group, among the arrangement of matrix of pixels, with respect to either one of the row and column, it is possible to keep arrangement relation other than a distance of the respective rows or columns and a pixel interval of single row or column.

Further, in the invention it is preferable that the transformation reference axis passes through the centers of the respective reference regions of the second matching means.

According to the invention, with respect to a plurality of pixels arranged on the transformation reference axis at least before transformation, even if an interval between pixels adjacent in one direction is changed, they are positioned on the transformation reference axis even after transformation. When the plurality of reference regions of the second matching means are set on the transformation axis, in the case where not less than three images-to-be-combined are combined, and after the images-to-be-combined of adjacent set are combined, when the image of the combined result is further combined with another image-to-be-combined or the image of the combined result, since the deviations of the reference regions in the other direction do not exist, the processing amount of calculation process is decreased. Thus, the processing amount of geometrical combining process is decreased.

Further, in the invention it is preferable that the image-to-be-combined and the combined image are respectively composed of a plurality of pixels; and among all pixels of the combined image, a pixel value expressing luminance of each pixel of a portion corresponding to the overlapped region of the image-to-be-combined is a weighted average value obtained by attaching a weight, which is determined corresponding to a distance from a predetermined combining reference axis in the overlapped region, to a pixel value of each pixel of two overlapped regions of the image-to-be-combined corresponding to the pixel.

According to the invention, among the combined images obtained by the image synthesizing apparatus, the portion corresponding to the overlapped portion of the respective images-to-be-combined is formed by superimposing the images-to-be-combined of adjacent set. The pixel value of this portion is obtained by weighted average of pixel value of each pixel of the two superimposed overlapped regions. By this, in the pair of images-to-be-combined, even when the luminance of the entire of one or the other image-to-be-combined is different, it is possible to smoothly change the luminance of the image of the subject from one image to the other image. Thus, the difference in luminance does not become noticeable.

Further, the invention provides an image synthesizing method comprising the steps of:

producing a plurality of signals of images-to-be-combined, the signals representing the images-to-be-combined including different portions of a subject, so that an image-to-be-combined including a portion of the subject and an adjacent image-to-be-combined including a portion adjacent to said portion of the subject have an overlapped region where a same portion of the subject is imaged in the images-to-be-combined;

making a check on matching of the images of the subject in the overlapped region for each set of adjacent images-to-be-combined among the produced image-to-be-combined signals, and detecting a relative positional deviation between the overlapped regions on the basis of a result of the check on matching;

setting a plurality of reference regions of a predetermined size in the overlapped region of one of the images-to-be-combined whose relative positional deviation is detected, for setting a search region larger than the reference region for each of the reference regions in the overlapped region of the other of the images-to-be-combined on the basis of the relative positional deviation, for making a check on matching of the images of the subject between the reference region and the search region corresponding to the reference region, and for detecting a relative positional deviation between the images of the subject on the basis of a result of the check on matching; and combining all the image-to-be-combined signals to superimpose the reference region and the search region corresponding to the reference region for each set of adjacent images-to-be-combined while partially deforming the respective images-to-be-combined to cancel the detected relative positional deviation, and producing combined image signals expressing a single combined image with respect to the subject.

According to the invention, the image synthesizing method detects the deviations of the subject through the two-step checking process on matching by the image synthesizing apparatus. By this, the number of matching processes is decreased, and a combined image with high resolution or a wide range and wide angle of view can be obtained.

BEST MODE FOR CARRYING OUT THE INVENTION

Figure 1:
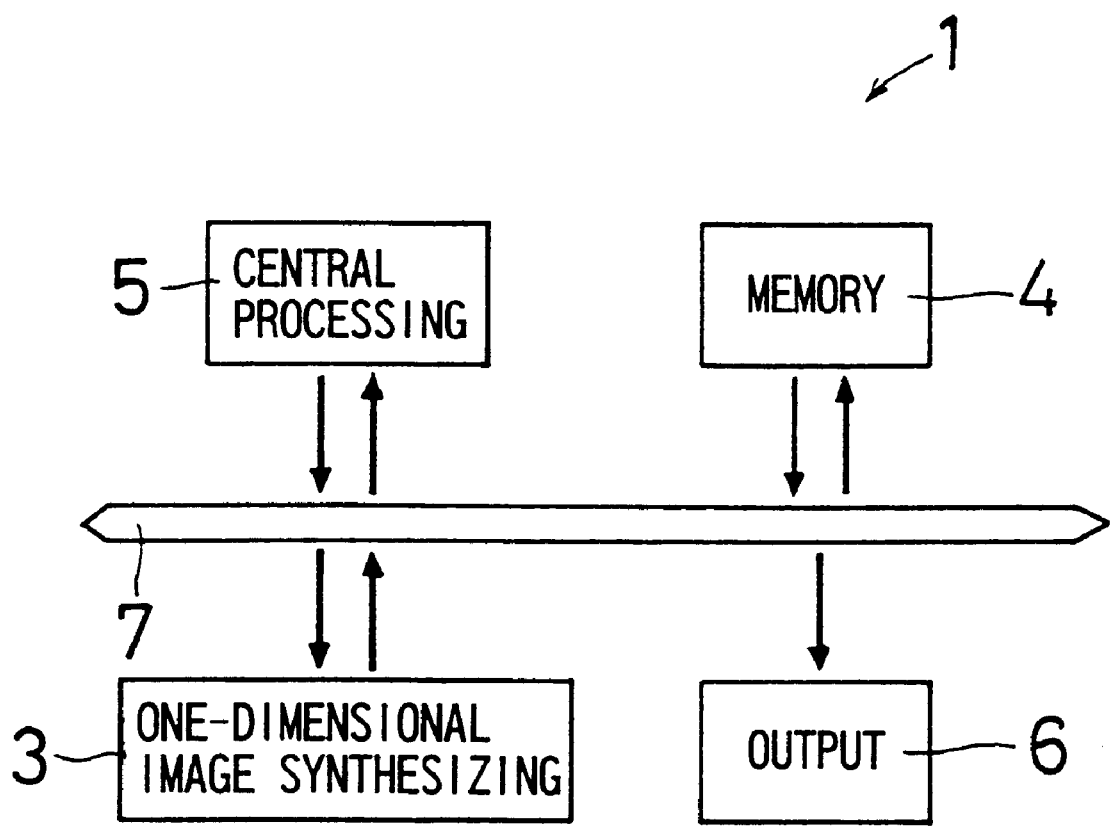
FIG. 1 is a block diagram for showing an electrical structure of an image synthesizing apparatus 1 of an embodiment of the present invention.

FIG. 1 is a block diagram showing an electrical structure of an image synthesizing apparatus 1 of an embodiment of the present invention. The image synthesizing apparatus 1 includes a one-dimensional image synthesizing unit 3, a memory 4, a central processing unit 5, and an output unit 6. These structural members 3 to 6 are electrically connected to each other through a bus line 7 to give and receive signals.

As described later, the one-dimensional image synthesizing unit 3 individually and continuously images a subject, and outputs a plurality of signals expressing images-to-be-combined. The image-to-be-combined is a so-called gray scale image in which luminance is changed stepwise from white to black. The plurality of signals of images-to-be-combined are stored in the memory 4. The central processing unit 5 reads the plurality of signals of images-to-be-combined stored in the memory 4 and combines them by a combining method described later, so that a combined image signal expressing a single combined image is produced. This combined image signal is stored in the memory 4, and is given to the output unit 6 which is realized by a cathode ray tube (CRT) and a printer. The output unit 6 visually displays the combined image signal as a combined image.

Figure 2:
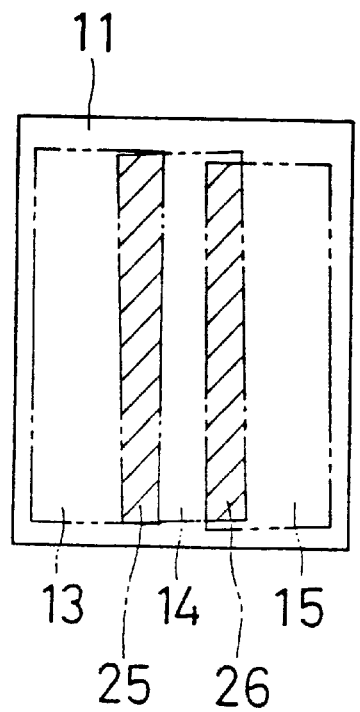
FIG. 2 is a schematic view showing the relation between a subject 11 and image pickup regions 13 to 15.

FIG. 2 is a schematic view showing a subject 11. In this embodiment, the subject 11 is a flat plate-like member whose surface is imaged. Of course, the subject 11 is not limited to one with this shape, but any shape may be adopted as long as it can be imaged by an image pickup apparatus such as a still camera and a video camera. The one-dimensional image synthesizing unit 3 images the surface of the subject 11 to virtually divide the surface into a plurality of image pickup regions. In this embodiment, the surface of the subject 11 is individually imaged as three rectangular image pickup regions 13 to 15 disposed in parallel with each other. At this time, the image pickup regions 13 to 15 are set so that adjacent image pickup regions have an overlapped region.

Figure 3:
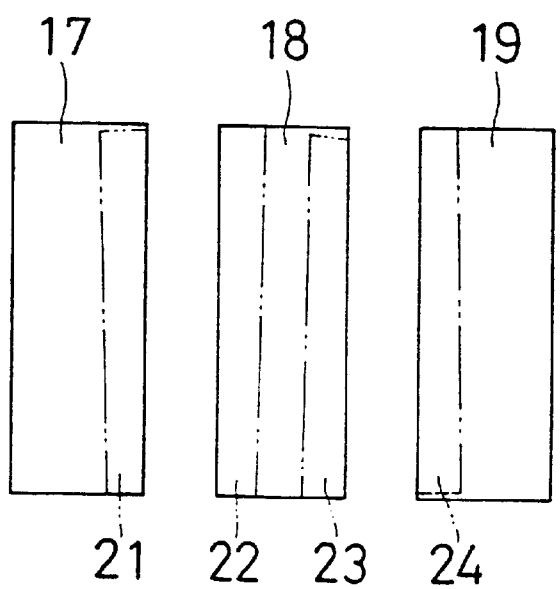
FIG. 3 is a schematic view showing images-to-be-combined 17 to 19.

FIG. 3 is a view showing images-to-be-combined 17 to 19 obtained by imaging the image pickup regions 13 to 15. The images-to-be-combined 17 to 19 include overlapped regions 21; 22, 23; 24. The overlapped region 21 of the image-to-be-combined 17 and the overlapped region 22 of the image-to-be-combined 18 have an image of a part 25 of the subject 11. Similarly, the overlapped region 23 of the image-to-be-combined 18 and the overlapped region 24 of the image-to-be-combined 19 have an image of a part 26 of the subject 11. The parts 25 and 26 are overlapped portions of the above-mentioned image pickup regions 13 to 15, and are shown with oblique lines in FIG. 2. It is preferable that these images-to-be-combined 17 to 18 have a low parallax in imaging. As an imaging method with a low parallax, imaging of horizontal and vertical movement called panning and tilting may be cited.

Figure 4:
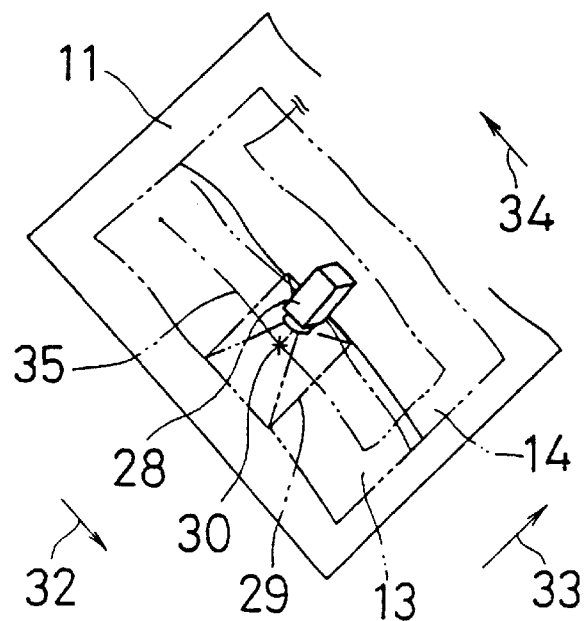
FIG. 4 is a schematic view for explaining a method of moving a video camera 28 of a one-dimensional image synthesizing unit 3.

FIG. 4 is a view for explaining a specific imaging operation of the one-dimensional image synthesizing unit 3. The one-dimensional image synthesizing unit 3 includes, for example, a video camera 28 equipped with a so-called CCD area sensor, as an image pickup apparatus. The CCD area sensor is a two-dimensional image pickup device in which light receiving areas are arranged in matrix on an imaging surface as a two-dimensional plane.

The start and end of the imaging operation of the video camera 28 is determined by, for example, an instruction by an operator of the image synthesizing apparatus 1. When the video camera 28 starts to image the subject 11, the operator holds the video camera 28 with his hands and moves it at a position apart from the surface of the subject 11 by a predetermined distance, so that an image pickup feasible range 29 moves according to the image pickup regions 13 to 15. This moving operation is carried out specifically such that the operator sees a finder of the video camera 28 or an image in the display device visually displaying the presently obtained image, determines a moving direction and moving amount of the range 29 so that the image pickup feasible range 29 includes a part of a region in which image pickup has been ended, and moves the video camera 28 so that the range 29 is moved in the moving direction and by the moving amount. This movement of the video camera 28 may be carried out by using a mechanical moving system, other than the manual operation by an operator, as long as the condition described above is satisfied.

By this, for example, when FIG. 4 is used as an example, the image pickup feasible range 29 is moved in the direction indicated by an arrow 32 so that its center point 30 first moves from one end to the other end of the image pickup region 13 in the longitudinal direction along the center axis in the longitudinal direction. At this time, the width of the image pickup region 13 in its width direction is equal to the width of the image pickup feasible range 30 in its longitudinal direction, and the image pickup feasible range 30 is moved so as to keep a state that its center axis passing through the center point 30 is in parallel with the center axis of the image pickup region 13.

Next, the image pickup feasible range 29 is horizontally moved in the direction indicated by an arrow 33 so that the image pickup feasible range 29 reaches the other end of the image pickup region 14 in its longitudinal direction. Subsequently, the center point 30 of the image pickup feasible range 29 is moved from the other end to one end of the image pickup region 14 in the longitudinal direction in the direction indicated by an arrow 34 along the center axis in the longitudinal direction. Next, the image pickup feasible range 29 is horizontally moved in the direction indicated by an arrow 33 so that the image pickup feasible range 29 reaches one end of the image pickup region 15, and after the movement, it is moved in almost the same way as imaging in the image pickup region 13. By this, the image pickup feasible range 29 is moved so that the center point 30 draws a locus 35.

After the operator's instruction to start image pickup, the video camera 28, for example, concentrates light so that image light from the subject in the image pickup feasible range 29 makes an image on the imaging surface of the image pickup device, and is received by the respective light receiving areas at the imaging surface. At each time when a predetermined light exposure time elapses, the image pickup device outputs electric charges corresponding to the amount of received light in the light exposure time as pixel data to the respective light receiving areas. By this, the video camera 28 outputs an original image signal composed of the pixel data at each time when the light exposure time elapses. The original image signal expresses an original image in which the number of pixels is equal to the number of light receiving areas of the image pickup device at the imaging surface and the arrangement of the pixels is similar to the arrangement of the light receiving areas. This original image is an image of a so-called one frame of moving images obtained by the video camera. Thus, while the image pickup feasible range 29 is moved, the video camera 28 outputs original image signals of plural frames.

Figures 5A, 5B:
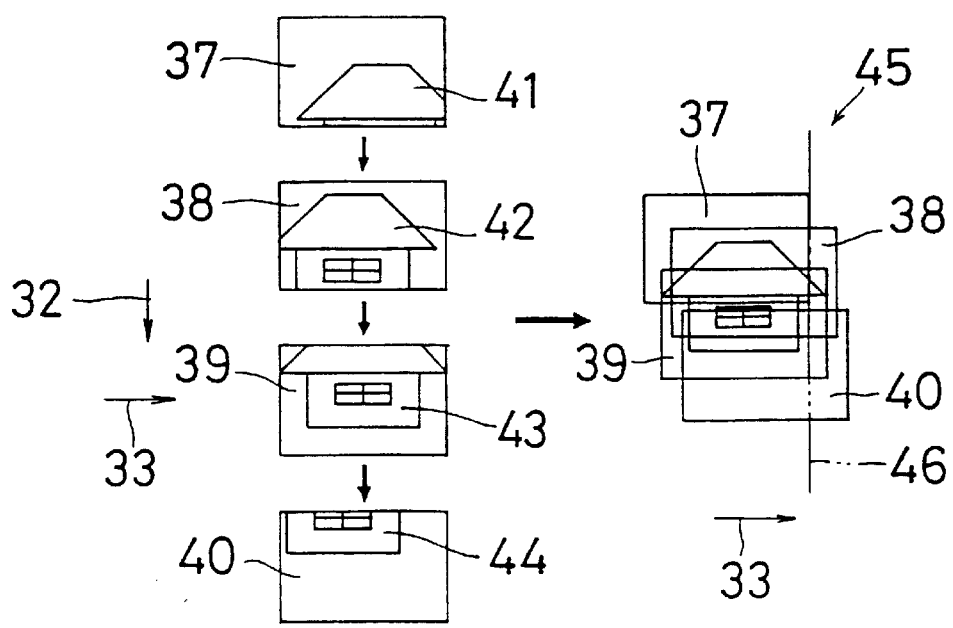
FIG. 5A and FIG. 5B are views showing original images 37 to 40 obtained by the video camera 28 and a schematic view for explaining a method of combining the original images 37 to 40.

For example, when the image pickup feasible range 29 is moved along the image pickup region 13, it is assumed that original image signals for four frames are continuously obtained. FIG. 5A and FIG. 5B are views showing original images 37 to 40 expressed by the original image signals in the order of imaging. The original images 37 to 40 include images 41 to 44 of the subject in which the same subject is imaged at different positions. These images 41 to 44 are coincident with each other when parts obtained by imaging the same part of the subject are superimposed, except cases where, for example, the subject moves during the imaging operation, and the parallax of the video camera 28 and magnification of an optical system change during the imaging operation.

The video camera1 28 detects correlation of the images of the subject of the original images of the respective frames obtained by the imaging operation, and from the detected correlation, the moving direction of the relative position between the image pickup feasible range 29 and the subject is detected. When this moving direction is turned, for example, when it is turned from the direction of the arrows 32 and 34 to the direction of the arrow 33, it is judged that imaging of the image pickup regions 13 and 14 is ended, and it is moved to the next image pickup regions 14 and 15. By this, even when the image pickup regions 13 to 15 are continuously imaged, the original images obtained by imaging the respective image pickup regions 13 to 15 can be automatically selected.

The relative position between the images of the subject in these original images 37 to 40 and the frame line of the original images 37 to 40 shifts not only in the original moving direction of the image pickup feasible range 29 indicated by the arrow 32 but also in the direction indicated by the arrow 33 and in the direction opposite thereto. It appears that this occurs because when the video camera 28 is moved by the method described above, the video camera 28 is supported by only the hand of the operator, so that the relative position to the subject 11 can shift by, for example, an unintentional movement of the operator's hands.

The one-dimensional image synthesizing unit 3 combines the original image signals of plural frames, and produces a signal of the above-mentioned image-to-be-combined 17. The method of producing signals of the images-to-be-combined 18 and 19 is also equal to that of the image-to-be-combined 17. The image-to-be combined is an image in which the original images 37 to 40 are superimposed so that the images-to-be-combined agree with each other.

Specifically, first, the image of the subject is subjected to a checking process on matching between the original images 37 and 38, 38 and 39, and 39 and 40, respectively, so that relative moving distance and moving direction of the image of the subject are obtained. This moving distance and moving direction are equal to the relative moving distance and moving direction of the image pickup feasible range 29 of the video camera 28.

Next, the one-dimensional image synthesizing unit 3 relatively moves the original images 37 to 40 by the obtained moving distance in the direction opposite to the obtained moving direction and superimposes them. FIG. 5A and 5B is a schematic view showing the state in which the original images 37 to 40 are superimposed by the method described above. Due to deviation in the direction of the arrow 33, an image 45 in the superimposed state has a shape partially protruding in the direction of the arrow 33 and in the opposite direction.

Finally, the one-dimensional image device 3 processes the image signal of the image 45 so that information other than images is not contained in the end of the image 45 in the direction of the arrow 33, and produces the signal of the image-to-be-combined 17. As this method, for example, when FIG. 5B is used as an example, there is cited a method in which like a case that a portion of the image 45 at a right side of an imaginary line 46 is cut off, pixel data of pixels constituting this portion are removed from the image signal of the image 45. Besides, in the image signal of the image 45, data for inhibiting setting of a search block described later may be added to pixel data expressing the portion other than images at the right side of the imaginary line 46. This is done for the purpose of preventing the search blocks from being set at portions other than images in the combining operations of the images-to-be-combined described later.

Figure 6:
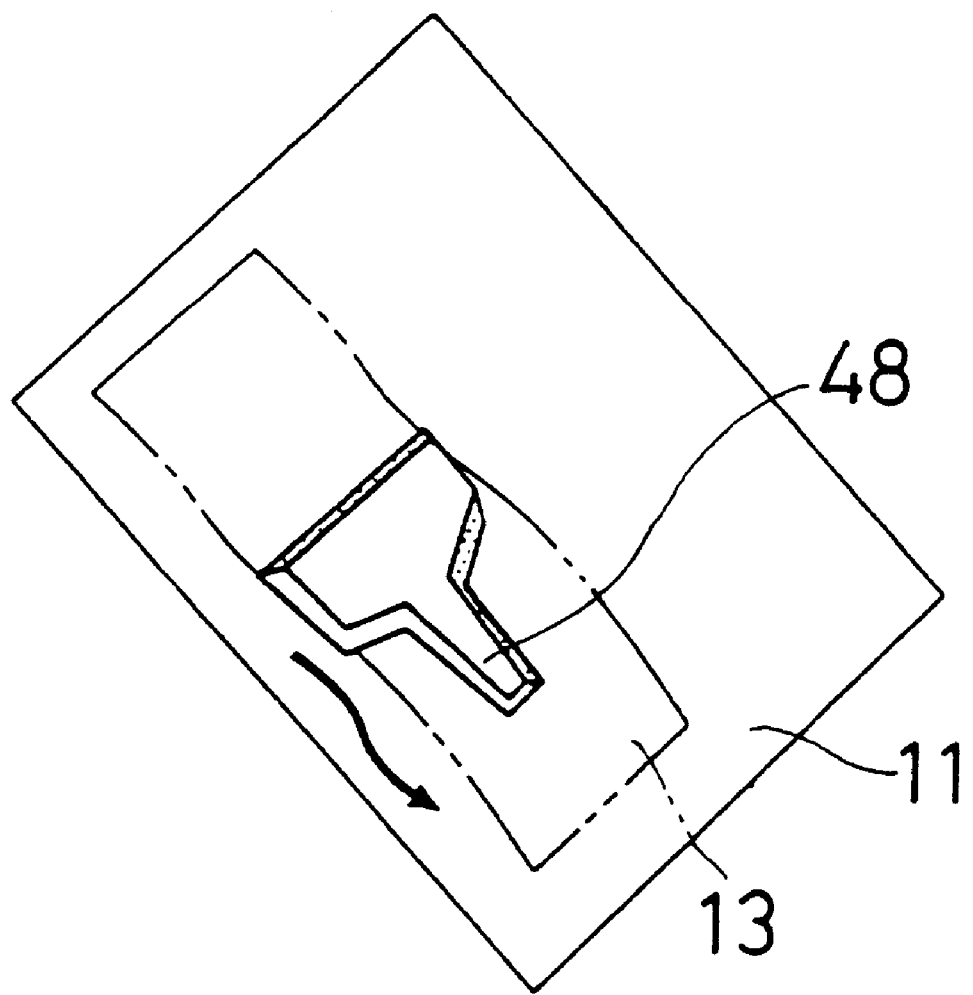
FIG. 6 is a schematic view for explaining a method of moving a hand scanner 48 of the one-dimensional image synthesizing unit 3.

The one-dimensional image synthesizing unit 3 may be a so-called hand scanner using a one-dimensional image pickup device in which light receiving areas are linearly disposed. When the image-to-be-combined 17 is obtained by using this hand scanner, as shown in FIG. 6, the width direction of the image pickup region 13 is made almost coincident with the arrangement direction of the light receiving areas of a hand scanner 48, and the subject 11 is imaged while the hand scanner 48 is moved along the longitudinal direction in the state where it is brought into contact with the surface of the subject 11. At this time, since the image pickup device moves almost in the same manner as the image pickup device of the video camera 28, when the hand scanner 48 is moved from one end to the other end of the image pickup region 13 in the longitudinal direction, a plurality of original image signals expressing original images in which pixels are linearly arranged are obtained. The one-dimensional image synthesizing unit 3 combines the original image signals such that these original images are sequentially arranged in the order of imaging while the arrangement directions of the pixels are made parallel with each other, and the image-to-be-combined 17 is obtained.

By such a method and by using the one-dimensional image synthesizing unit 3 using the video camera 28, the above-mentioned images-to-be-combined 17 to 19 of FIG. 3 are produced. Although the shapes of the images-to-be-combined 17 to 19 and the images of the subject in the images-to-be-combined are respectively almost similar to the shapes of the image pickup regions 13 to 15 and the images of their surfaces, distortion partially occurs. It is conceivable that this is because, for example, the video camera 28 is manually moved by the operator, so that it is difficult to keep the distance between the subject 11 and the video camera 28 at a predetermined distance, and the distance fluctuates. It is also conceivable that although the hand scanner 48 is provided with a pair of rollers to make smooth movement on the surface of the subject 11, the sliding of the pair of rollers is irregular so that the moving speed of the hand scanner 48 fluctuates.

Further, the images-to-be-combined 17 to 19 sometimes include a rotation so that the center axes of the image pickup regions 13 to 17 in the longitudinal direction are not made parallel to each other but make some angle. It appears that this occurs from the same reason as the above-mentioned distortion, that is, an unintentional movement of hands occurs so that the moving direction of the video camera 28 and the hand scanner 48 deviates from the original moving direction and shifts. Thus, the images of the subject in the overlapped regions 21, 22; 23, 24 do not agree with each other even if the translation of the images-to-be-combined 17 to 19 is merely carried out, in spite of the fact that the same parts 25 and 26 of the subject are imaged.

Figure 7:
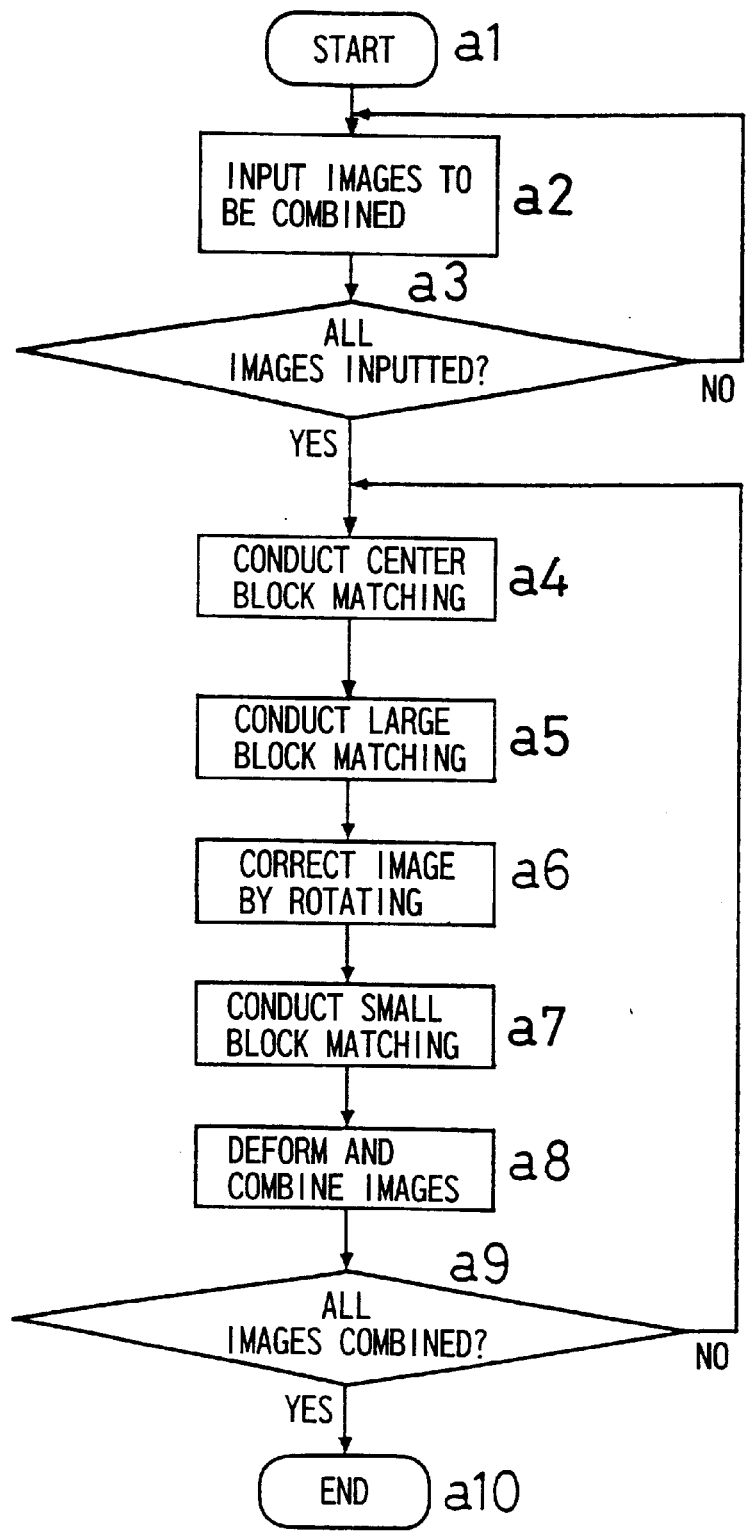
FIG. 7 is a flowchart for explaining an image synthesizing method using the image synthesizing apparatus 1.

FIG. 7 is a flowchart for explaining an image synthesizing operation in the image synthesizing apparatus. For example, when a user of the image synthesizing apparatus makes instructions of combining operation, step a1 proceeds to step a2.

At step a2, a plurality of signals of images-to-be-combined are inputted in the central processing unit 5. With respect to the signals of images-to-be-combined, the signals obtained by the method described before may be directly obtained from the one-dimensional image synthesizing unit 3, or desired signals among the plurality of signals of images-to-be-combined stored in the memory 4 may be selected and read. Each time when the signals of images-to-be-combined for one piece are inputted, step a2 proceeds to step a3.

At step a3, it is judged whether all signals of images-to-be-combined necessary for obtaining the combined image signal are obtained. When all the signals of the images-to-be-combined are not obtained, the process returns to step a2, and a next signal of an image-to-be-combined is inputted. When all the signals of the images-to-be-combined are obtained, step a3 proceeds to step a4. In steps subsequent to step a4, a combining process for combining, in the signals of the images-to-be-combined, a pair of images-to-be-combined in which the image pickup regions are adjacent to each other and which include an overlapped region where the same part of the subject 11 is imaged, is carried out.

At step a4, a center block matching process for detecting an amount of relative translation of images of the subject in the pair of images-to-be-combined is carried out. Next, at step a5, a large block matching process for detecting an amount of detailed translation of the images of the subject in the pair of images-to-be-combined and a relative angle of rotation is carried out. Next, at step a6, on the basis of the detection result of the large block matching process, a rotation correction process of images is applied to the pair of signals of the images-to-be-combined. At step a7, a small block matching process for detecting a relative distortion of images of the subject of the pair of images-to-be-combined is carried out. At step a8, on the basis of the detection result of the small block matching process, a deformation process and combining process of images are applied to the pair of signals of the images-to-be-combined, and the pair of signals of the images-to-be-combined are combined. The details of the processing operations of the respective steps a4 to a8 will be described later.

At step a9, it is judged whether the series of combining processes is applied to all the signals of the images-to-be-combined and a single combined image signal is obtained. If not, step a9 returns to step a4, and a series of combining processes from step a4 to step a8 is applied to another pair of image-to-be-combined signals. Any set may be adopted for the set of another pair of image-to-be-combined signals as long as the set includes an overlapped region where the same portion of the subject 11 is imaged. For example, one of the pair of image-to-be-combined signals which have been combined by the method described above may be combined with another image-to-be-combined signal. Alternatively, a set of the image signals each obtained by combining a pair of image-to-be-combined signals through the method described above may be adopted.

At step a9, if it is judged that all the image-to-be-combined signals are combined, step a9 proceeds to step a10, and the process operation of the flowchart is ended.

A method of combining a pair of image-to-be-combined signals at step a4 to step a8 in the flowchart will be described below in detail. In the following explanation, a combining process of the pair of image-to-be-combined signals expressing the images-to-be-combined 17 and 18 is used as an example, and the respective process operations will be described. The images-to-be-combined 17 and 18 are produced by the method described above, and each is a rectangular image in which projecting portions at both ends in the longitudinal direction are cut away. For each of the images-to-be-combined 17 and 18, a two-dimensional rectangular coordinate system with the origin of a vertex at the left upper end in the drawing is set. The x and y coordinate axes in this coordinate system are respectively in parallel to the width direction and longitudinal direction of the images-to-be-combined 17 and 18. Hereinafter, the width direction parallel to the x-axis of coordinates may be called an x-direction, and the longitudinal direction parallel to the y-axis of coordinates may be called a y-direction.

Figure 8:
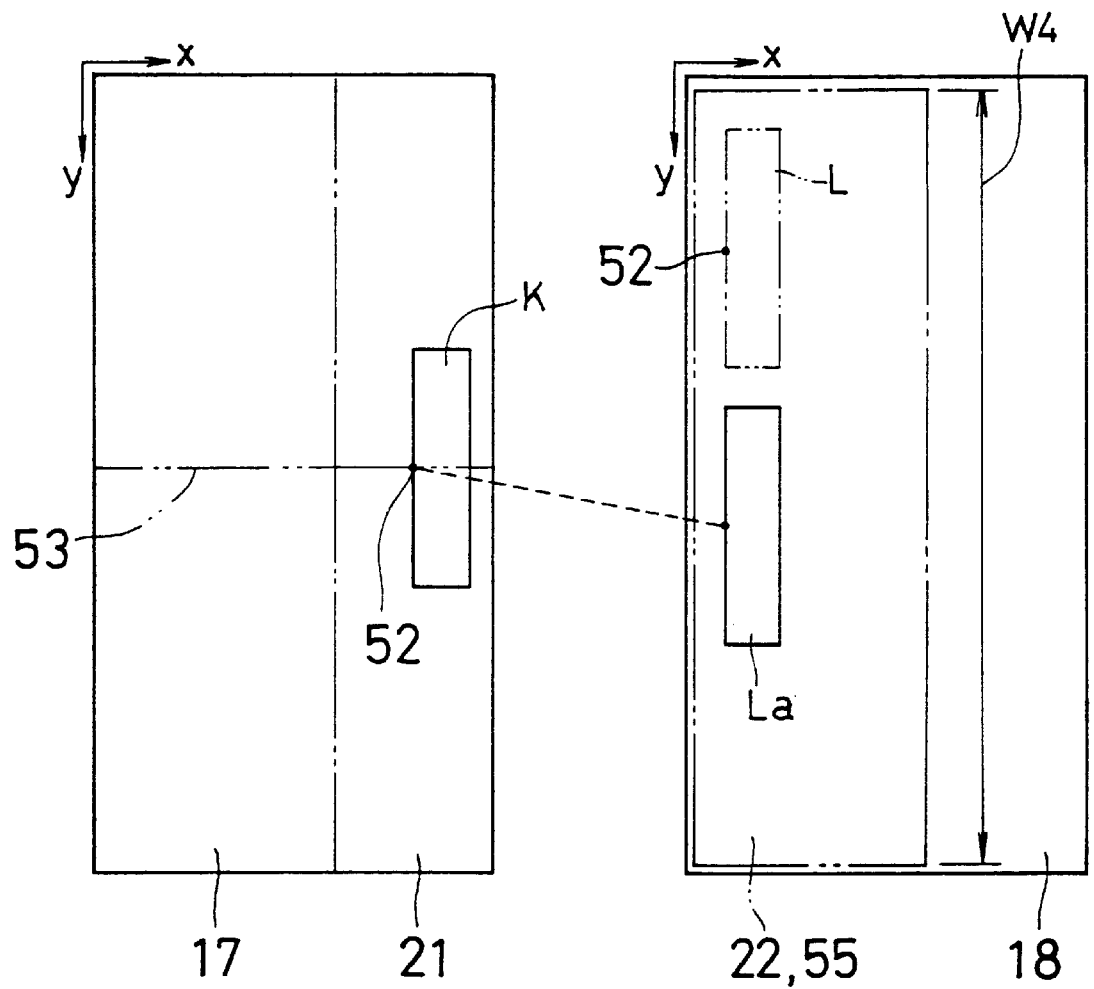
FIG. 8 is a schematic view showing the relation among reference block K, search region 55, and search block L at a center block matching process.

FIG. 8 is a schematic view for explaining the center block matching process at step a4 of the flowchart. In the center block matching process, a so-called template matching process is used, and an amount of relative translation of images of the subject in the images-to-be-combined 17 and 18 is detected.

First, reference block K is set in the overlapped region 21 of the image-to-be-combined 17. The reference block K is arranged such that its reference point 52 is positioned on a reference axis 53 halving a side of the image-to-be-combined 17 in the y-direction. Next, a search region 55 is set in the overlapped region 22 of the image-to-be-combined 18. The search region 55 is set to include almost all region of the overlapped region 22, and in this embodiment, it coincides with the overlapped region 22. Like this, when the reference block K is set at the center of the overlapped region 21 in the y-direction, even in the case where the subjects in the images-to-be-combined 17 and 18 are shifted in any direction of the y-direction, the deviation can be detected.

Subsequently, the so-called template matching process is carried out between the reference block K of the image-to-be-combined 17 and the search region 55 of the image-to-be-combined 18. In the process, the position of an image most similar to the image of the subject in the reference block K is searched in the search region 55.

The template matching process will be described below in detail.

In the process operation of the process, first, a search block L which is congruent with the reference block K is set so that a reference point 52 of the block L coincides with some point in the search region 55. Next, similarity between the image of a part defined by the search block L in the images of the subject in the search region 55 and the image of a part defined by the reference block K in the images of the subject in the overlapped region 21 is detected. This similarity is indicated such that, for example, an absolute value $|k-l|$ of a difference value between pixel data k of a pixel in the reference block K and pixel data l of a pixel in the search block L at the same position as the former pixel is obtained for all pixels in the reference block K, and the similarity is indicated by a total sum value d(kl) expressing the sum total. There is also a case where it is expressed by correlation of pixel data k and l of the pixels.

When the similarity at some point is detected, a point with which the reference point 52 is made coincident is moved in the search region 55, and the similarity at the point after movement is detected by a similar method. Such a detecting operation of the similarity is repeatedly carried out at each of a plurality of points in which the points are determined so that the ranges defined by the search blocks L cover all the search region 55. When the detecting operations of the similarity at all the determined points are ended, the total sum values d(kl) of the search blocks L in which the respective points are the reference point 52 are obtained, the number of which is the same as the number of the points. At this time, pixel data of each pixel in the search region 55 is used at least one time for calculation of the total sum value d(kl).

When the total sum values d(kl) at all the points in the search region 55 are detected, subsequently, among all the detected total sum values d(kl), a point where a minimum total sum value d(kl) is obtained, and a search block L set with the point as reference are searched. That the total sum value d(kl) is minimum means that the image of the subject in the search block L in the search region 55 is most similar to the image of the subject in the reference block K. The search block L in which the total sum value d(kl) is minimum is made a minimum search block La and is shown in FIG. 8. When the minimum search block La is obtained, the template matching process is ended.

The accuracy of this template matching process is improved as the size of the reference block K and the search block L becomes small. However, if the reference block K and the search block L are made small without changing the size of the search region 55, there is increased a possibility that a search block set at a place different from the corresponding place where a check on matching is originally made, is similar to the reference block, so that a check on matching is made at the quite erroneous place. It is preferable that the size of the search and reference blocks K, L in the center block matching process is larger than reference and search blocks f1, f2, g1, g2; ba, bb in the large block and small block matching processes described later. This is because it is sufficient if the center block matching process detects only an amount of translation of the subject which is broader than the deviation of the subject to be detected in the large block and small block matching processes. Of course, the size of these blocks can be set arbitrarily irrespective of the relation of size described above.

In the above template matching process between the reference block K and the respective search blocks L, in the detecting operation of the similarity, the plural search blocks L are directly set in the search region 55, and the total sum value d(kl) at each point is obtained. In the template matching process, a so-called layer matching process may be used.

In the layer matching process, first, the search region 55 is reduced, and the number of pixels in the search region 55 is decreased, and then, the search block L is set for the reduced region. For example, if the search region 55 is reduced to a half length in the x- and y-directions, respectively, four pixels of two rows and two columns of images before reduction correspond to one pixel after reduction. By this, the number of search blocks L to be set for covering all the search region 55 becomes one fourth of the number of search blocks L to be set in the search region 55 before reduction. In this state, the similarity as to all search blocks L is obtained, and the position of the minimum search block La with the highest similarity is obtained. Next, the size of the reduced search region 55 is enlarged, and the template matching process is again applied to the images of the subject in the minimum search block La and in the vicinity thereof. This operation is sequentially repeated until the search region 55 returns to the original size. By this, the process amount of the calculation process for obtaining the total sum value d(kl) of the respective search blocks of the entire of the search region 55 can be decreased.

Figure 9:
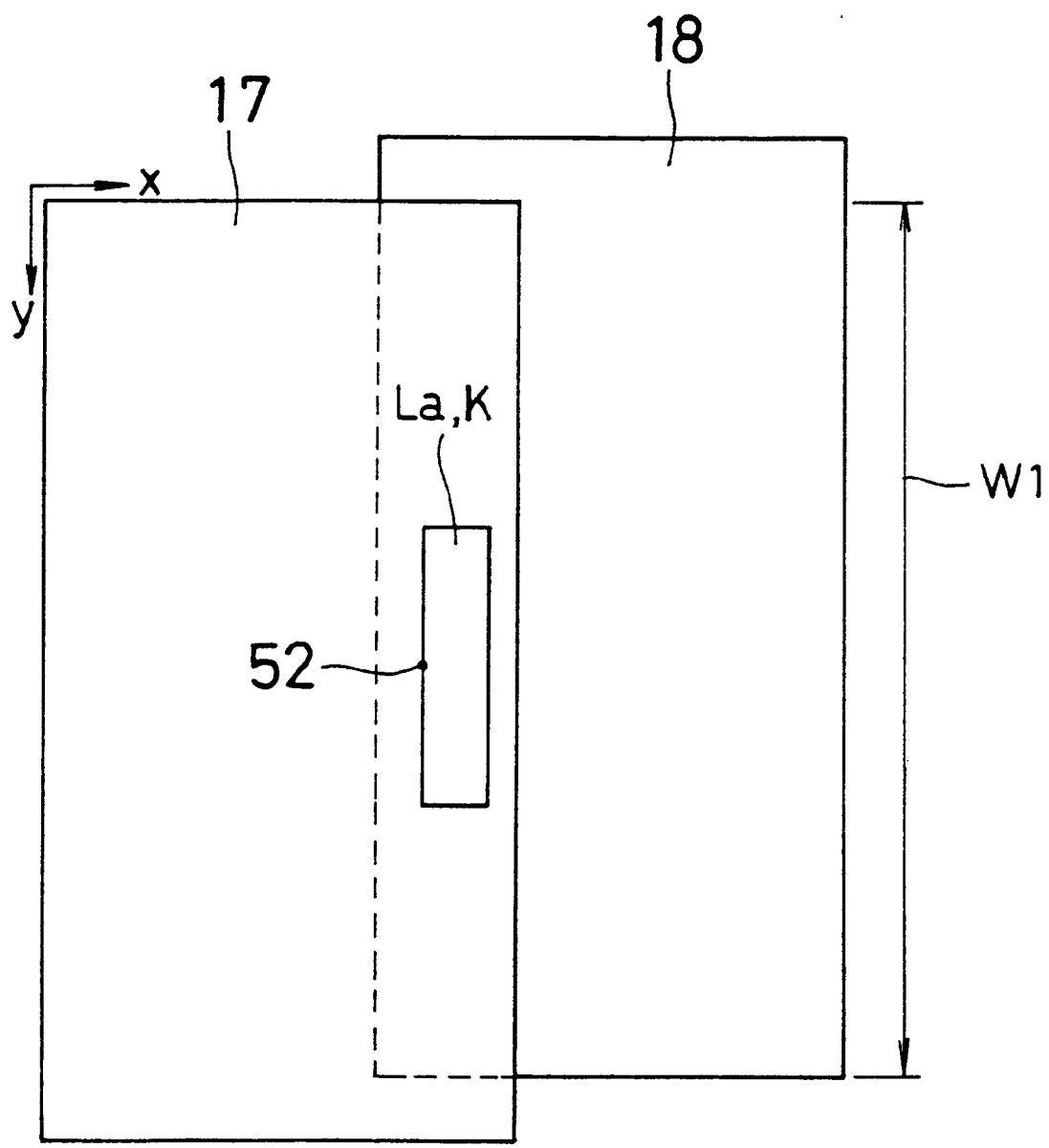
FIG. 9 is a schematic view showing the state in which with respect to a pair of images-to-be-combined 17 and 18, the reference block K and minimum search block La at the center block matching process are made to agree with each other.

When the images-to-be-combined 17 and 18 are superimposed so that the minimum search block La obtained by such a method and the reference block K are superimposed, and when the translation operation of the images of the subject in the overlapped regions 21 and 22 is made, as shown in FIG. 9, it is understood that the images-to-be-combined 17 and 18 are superimposed while being shifted in the y-direction. It is preferable that the amount of translation of the images-to-be-combined 17, 18: 18, 19 in the image synthesizing apparatus 1 of this embodiment is at most one third of the width of the image-to-be-combined in the y-direction. In the following explanation, it is assumed that there is little translation of the images of the subject of the images-to-be-combined 17 and 18.

Like this, in the center block matching process, it is possible to detect the amount of translation of the images of the subject in the pair of images-to-be-combined in the y-direction. On the basis of the matching result of the center matching process, the central processing unit 5 makes rough positioning of the images of the subject in the images-to-be-combined 17 and 18.

Figure 10:
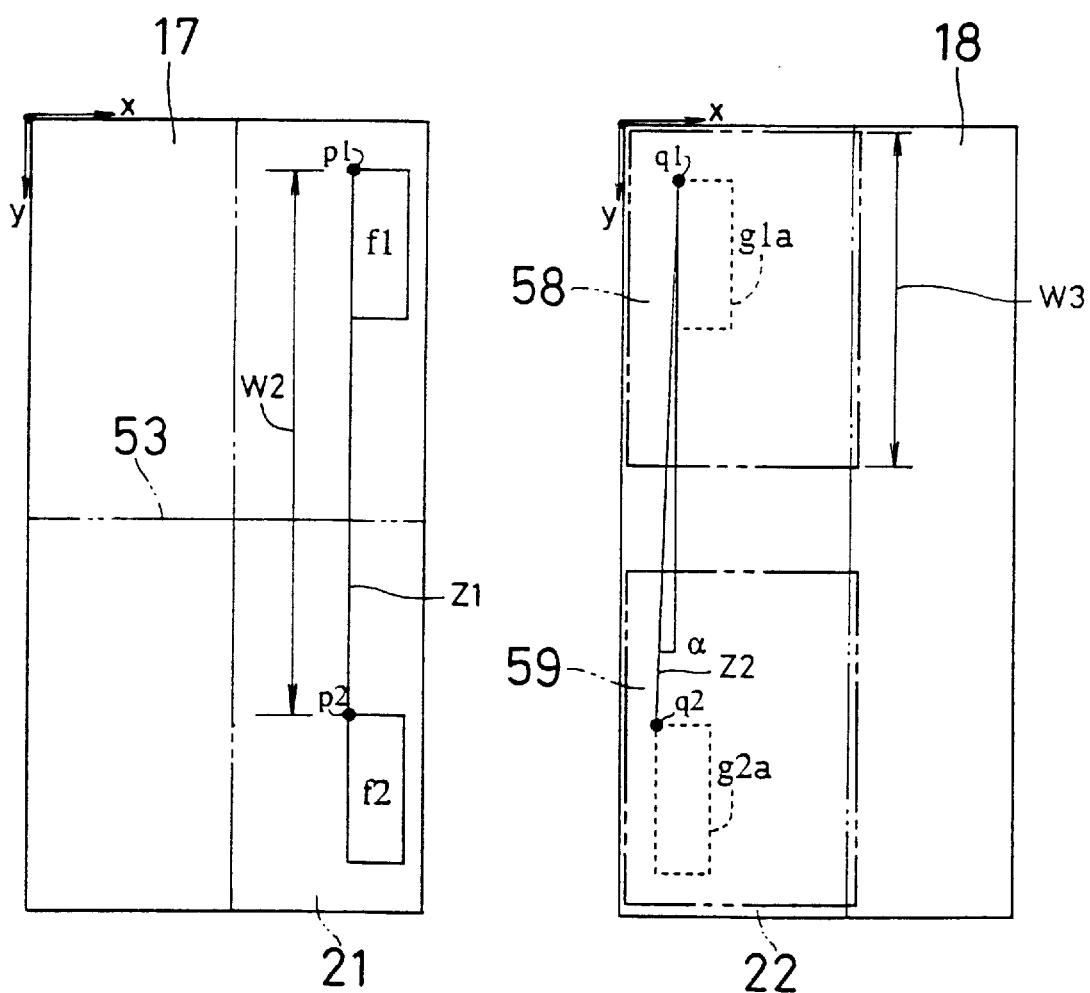
FIG. 10 is a schematic view showing the relation among reference blocks f1, f2, search regions 58, 59, and minimum search blocks g1a, g2a at a large block matching process.

Subsequently, the large block matching process will be described below in detail with reference to FIG. 10. The large block matching process uses a so-called template matching process and is carried out to make positioning of images of the subject in the images-to-be-combined 17 and 18 and to obtain an angle of relative rotation of the images-to-be-combined 17 and 18.

First, reference blocks f1 and f2 are set in the overlapped region 21 of the image-to-be-combined 17. The set positions of the reference blocks f1 and f2 are selected so that the portions defined by the reference blocks f1 and f2 contain distinctive portions in the image of the subject in the overlapped region 21. The distinctive portion is a portion where the change in luminance of pixels is large, for example, a so-called edge. The position of the edge can be obtained from an image signal obtained by passing the image-to-be-combined signal of the image-to-be-combined 17 through a Sobel filter. The reference blocks f1 and f2 are set smaller than the reference block K of the center block matching process. For example, they are set to such a shape and size that pixels arranged in matrix of 200 rows and 60 columns are contained in the portion defined by the reference blocks f1 and f2 in the overlapped region 21.

The separation distance W2 between the reference blocks f1 and f2 in the longitudinal direction is a distance within the width W1 of the overlapping portion of the images-to-be-combined 17 and 18 shown in FIG. 9 in the longitudinal direction, and it is preferable that the distance is as large as possible. Further, in order to prevent such a case that the deviation of the subject in the images-to-be-combined 17 and 18 in the y-direction can not be processed, it is preferable to set the reference blocks f1 and f2 at portions except the vicinity of both ends of the overlapped region 21 in the y-direction. From these, in the following explanation, it is assumed that the reference blocks f1 and f2 are set at both sides of the reference axis 53 in the y-direction, and their reference points p1 and p2 are separated by the separation distance W2 in parallel to the y-axis of coordinates.

Next, search regions 58 and 59 corresponding to the reference blocks f1 and f2 are set in the overlapped region 22 of the image-to-be-combined 18. The set position of the search regions 58 and 59 in the y-direction is selected at a position where, when the images-to-be-combined 17 and 18 are arranged so that the x-axes and y-axes of coordinates become in parallel with each other, relative translation has been made, from the viewpoint of the reference block f1, along the y-direction by the amount of translation detected by the center block matching process.

The size of the search regions 58 and 59 is respectively determined by the size of deviation of the image of the subject in the images-to-be-combined 17 and 18 in the y-direction, the size of the overlapped regions 20 and 21, and the change degree in the details of the image of the subject. For example, the width W3 of the search regions 58 and 59 in the y-direction is shorter than the width W4 of the search region 55 in the y-direction at the center block matching process. The width in the x-direction is almost equal to the width of the overlapped region 22 in the x-direction. Search blocks g1 and g2 equal to the reference blocks f1 and f2 in size and shape are set in the search regions 58 and 59.

Subsequently, the central processing unit 5 individually performs the template matching process of the reference block f1 to the search region 58, and the template matching process of the reference block f2 to the search region 59, respectively. The process method of the template matching process is almost equal to the center block matching process, and total sum values d1 (fg), d2 (fg) of difference values of pixel values are obtained as similarity as shown in the following equation.

$$dn(fg) = \Sigma |fn - gn| \quad (1)$$

The reference numerals "f" and "g" denote values of pixel data expressing the luminance of pixels in the reference block and the search block, respectively. A value of 1 or value of 2 is substituted for "n". When a value of 1 is substituted, "f" and "g" correspond to the pixel data of the reference block f1 and the search block g1. When a value of 2 is inputted, "f" and "g" correspond to the pixel data of the pixel of the reference block f2 and the search block g2.

When minimum search blocks g1a and g2a are respectively obtained for the search regions 58 and 59 by the template matching process, from reference points q1 and q2 of the minimum search blocks g1a and g2a, an amount of detailed translation of the image of the subject in the x- and y-directions in the overlapped regions 21 and 22, and a rotation angle α are obtained.

The rotation angle α is an angle formed between a line segment z1 with both ends of the reference points p1 and p2 of the reference regions f1 and f2 and a line segment z2 with both ends of the reference points q1 and q2 of the minimum search blocks g1a and g2a, when the combination-subject-images 17 and 18 are arranged so that the x-axes and y-axes of coordinates become in parallel with each other. It is conceivable that the rotation angle a is the sum of an angle formed between they-axis of coordinates of the combination-subject-image 17 and the line segment z1, and an angle formed between the y-axis of coordinates of the combination-subject-image 18 and the line segment z2. In this embodiment, since it is assumed that the line segment z1 is in parallel with the y-axis of coordinates of the combination-subject-image 17, the rotation α is equal to an angle formed between the y-axis of coordinates of the combination-subject-image 18 and the line segment z2.

Next, a rotation correction process of an combination-subject-image will be described below in detail. In the rotation correction process, the coordinates of representative points corresponding to pixel values of pixels of the images-to-be-combined 17 and 18 are relatively rotatively transformed so that the rotation angle α is cancelled and the line segments z1 and z2 are made parallel with each other. For example, in this rotation transformation, the coordinates (x, y) of the representative point of each pixel of the image-to-be-combined 18 are transformed with the reference point q1 of the minimum search block g1a as the center, based on the following equation.

$$\begin{bmatrix} x^* \\ y^* \end{bmatrix} = \begin{bmatrix} \cos(-\alpha) & -\sin(-\alpha) \\ \sin(-\alpha) & \cos(-\alpha) \end{bmatrix} \begin{bmatrix} x \\ y \end{bmatrix} \quad (2)$$

Reference numerals "x" and "y" are values of x- and y-coordinates of the representative point of a pixel in the image-to-be-combined 18 before rotation transformation. Reference numerals "x*" and "y*" are values of x- and y-coordinates of the representative point of the same pixel after rotation transformation. The coordinates (x, y) of the representative point before rotation transformation denote respectively a point in each pixel, and for example, are coincident with so-called lattice points of the xy rectangular coordinate system of the image-to-be-combined 18. The representative points after rotation transformation are often not coincident with lattice points.

When such coordinate transformation is carried out, the position of the representative point of each pixel is angle shifted reversely when seen from the original image-to-be-combined 17, by the rotation angle a from the original position, with the reference point q1 as a basis. By this, the relative position of the image-to-be-combined 18 to the image-to-be-combined 17 is reversely rotated by the rotation angle α so that the images of the subject in the images-to-be-combined 17 and 18 can be arranged parallel with each other.

Subsequently, the small block matching process of the images-to-be-combined 17 and 18 will be described below in detail. The small block matching process detects deviations of the subject to be corrected in the deformation of images and combining process operation described later.

Figure 11:
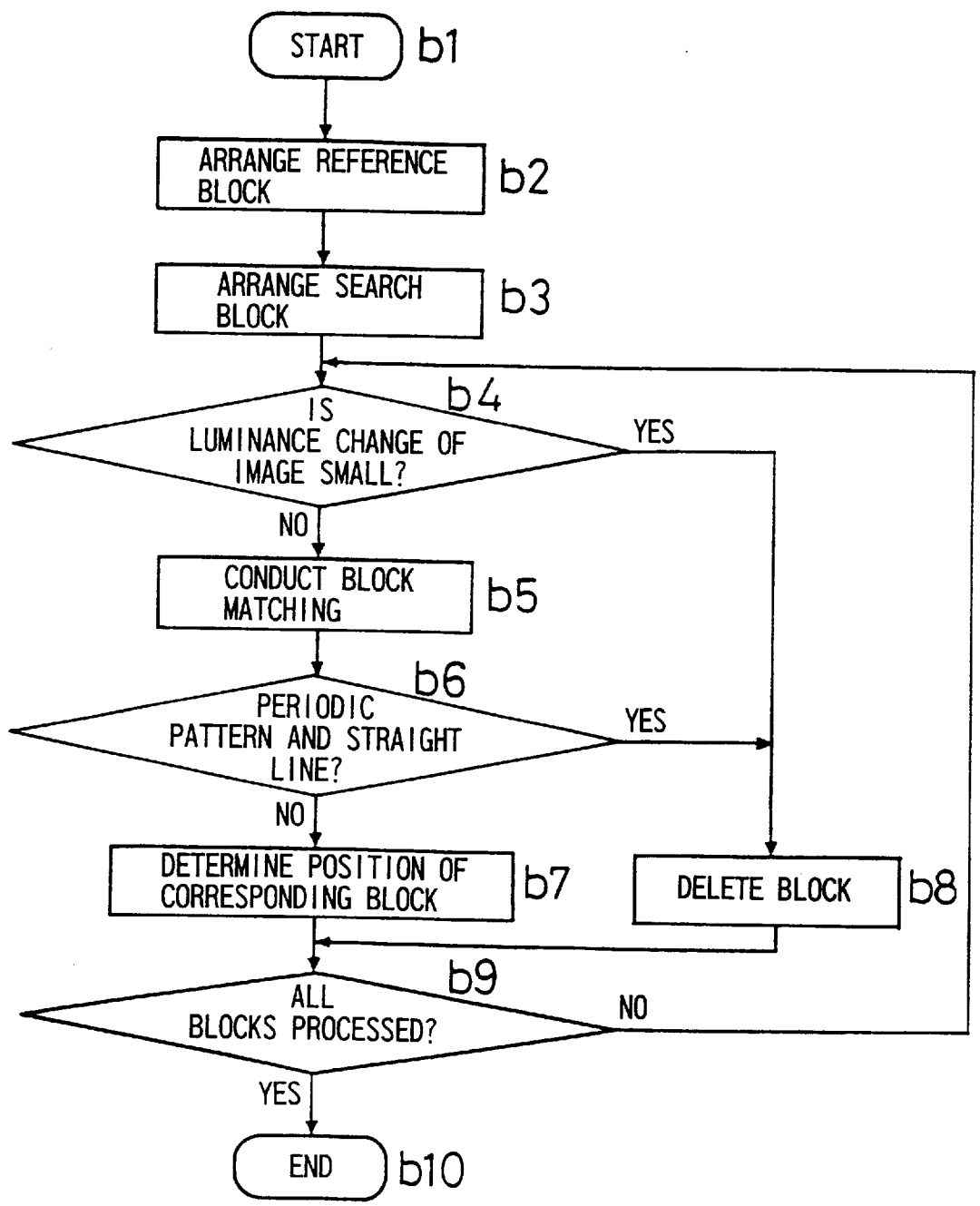
FIG. 11 is a flowchart for explaining a small block matching process method.
Figure 12:
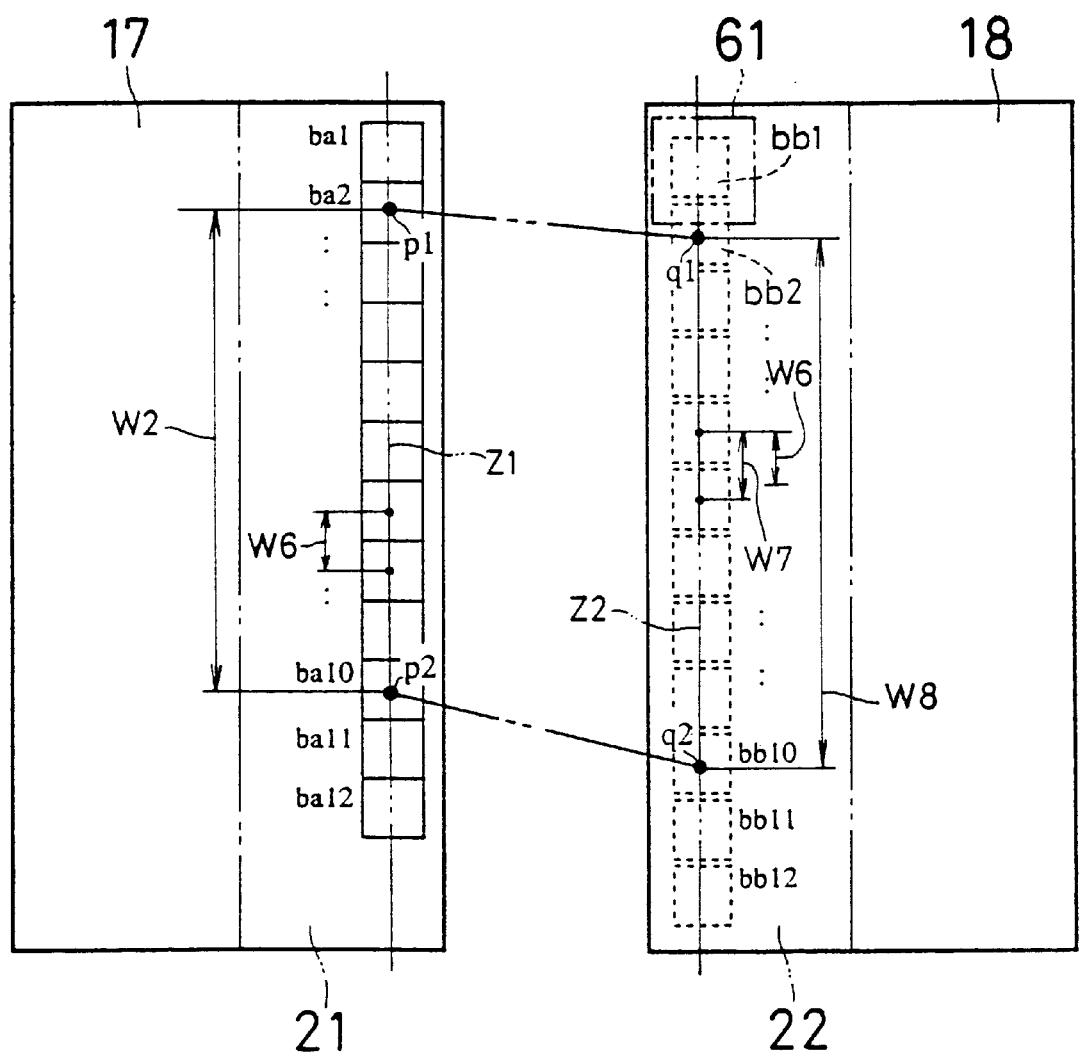
FIG. 12 is a schematic view showing the relation among reference blocks ba1 to ba12, search region 61, and search blocks bb1 to bb12 at the small block matching process.

FIG. 11 is a flowchart for explaining a processing procedure of the small block matching process. FIG. 12 is a schematic view for explaining the small block matching process. Explanation will be made with reference to both FIGS. 11 and 12. When step a6 proceeds to step a7 in the flowchart of FIG. 7, step b1 proceeds to step b2.

At step b2, a plurality of reference blocks ba are set in the overlapped region 21 of the image-to-be-combined 17. For example, in FIG. 12, 12 reference blocks ba1 to ba12 (referred to generically as reference block ba) are prepared, and their center points are set on the line segment z1 and its extension so that the respective blocks are linearly arranged without overlapping. These reference blocks ba1 to ba12 are, for example, rectangular blocks, and when the center point is made a basis, they are arranged linearly while adjacent two center points are separated with a predetermined interval W6.

The respective reference blocks ba1 to ba12 are smaller than the reference blocks f1 and f2 of the large block matching process, and for example, each is set to the size including pixels of 30 rows and 30 columns. At this time, the reference points p1 and p2 as both ends of the line segment z1 are contained in the reference blocks ba2 and ba10 which are arranged at second and tenth positions when counted from one end in the y-direction. When the reference block ba is arranged, step b2 proceeds to step b3.

At step b3, search blocks bb are arranged in the order described later and are set in the overlapped region 22 of the image-to-be-combined 18. The search blocks bb are prepared individually correspondingly to the reference blocks ba and the number thereof is the same. In FIG. 12, 12 search blocks bb1 to bb12 (referred to generically as search block bb) are prepared. The respective search blocks bb1 to bb12 are blocks with the same size and shape as the reference blocks ba1 to ba12, and are rectangular blocks in this embodiment.

The search blocks bb are set so that their center points ma1 to ma12 are linearly arranged on the line segment z2 and its extension. Among the search blocks bb, the search blocks bb2 and bb10 corresponding to the reference blocks ba2 and ba10 contain the reference points q1 and q2. The relative positional relation between the search blocks bb2, bb10 and the reference points q1, q2 is equal to the relative positional relation between the reference blocks ba2, ba10 and the reference points p1, p2.

The search blocks bb1, bb3 to bb9, bb11, and bb12 are arranged so that, for example, when the center points are made bases, adjacent two center points form an interval W7. The interval W7 is equal to a length obtained by dividing the length W8 of the line segment z2 by the number of search blocks bb intervening between the reference points q1 and q2. In FIG. 12, since the number of search blocks bb between the reference points q1 and q2 is 8, the interval W7 is equal to a length obtained by dividing the length W8 by 8. Since the interval W7 is wider than the width W6 of the search block bb in the y-direction, a gap is generated between adjacent two search blocks bb. On the contrary, when the interval W7 is narrower than the width W6, there is a case where partial regions of adjacent two search blocks bb overlap with each other.

Search regions 61 respectively containing the search block bb are set around the respective search blocks bb. For example, the center of the search region 61 of the search block bb1 is coincident with the center of the search block bb1. This search region 61 is set so that for example, the space for six pixels is added to both sides of the search block bb in the x- and y-directions, and its size becomes such that pixels arranged in matrix of 42 rows and 42 columns are contained in total. When the search blocks bb are arranged in this way, step b3 proceeds to step b4. In steps subsequent to step b4, for each of the search regions 61 including the search blocks bb, the template matching process of the respective reference blocks ba1 to ba12 to the search region 61 is individually carried out.

At step b4, with respect to the search region 61 to which the matching process is applied, it is judged whether the change in luminance of pixels in the search region 61 is small. For example, in a plurality of pixels in the search region 61, when a difference between a maximum value and a minimum value in values of pixel data expressing the luminance is less than a predetermined difference, it is judged that the change in luminance is small. By this judgement, it is possible to previously remove such a search region 61 of, for example, a white image that the image change of images of the subject is small so that the matching process is difficult, from matching process objects. Only when it is judged that the change in luminance of the image is large, step b4 proceeds to step b5. At step b5, to the search region 61 of the objective of the matching process which is judged as described above, the template matching process operation of the reference blocks ba corresponding to the region 61 is carried out. When the process is ended, step b5 proceeds to step b6.

At step b6, it is judged whether the image of the subject in the search region 61 of the objective of the matching process is an image like a periodic pattern and straight line. Specifically, for example, in the search region 61, when there are a plurality of points where the value of similarity becomes higher than a judgement reference value, it is judged that the image of the subject is the periodic pattern and straight line. When the image of the subject is the periodic pattern and straight line, a plurality of points in which the value of similarity is almost the same are detected, so that there is often a case where an accurate result can not be obtained by the template matching process. Thus, in the small block matching means, a search region containing images of the subject including the periodic pattern and straight line is previously removed from an subject of a process operation described later. Only when the image of the subject is not the periodic pattern and straight line, step b6 proceeds to step b7. At step b7, from the processing result of the template matching process at step b5, a minimum search block bba is set in the search region 61.

At step b4, when it is judged that the change in luminance of images of the subject in the search region 61 of the matching process subject is small, and at step b6, it is judged that the image of the subject is the periodic pattern and straight line image, steps b4 and b6 proceed to step b8. At step b8, the search region 61 of the objective of the matching process, and the reference block ba and the search block bb corresponding thereto are deleted. By this, it is possible to previously remove one in which it is expected that the process result of the template matching process becomes inferior. It is also possible to adopt such that after the template matching process is carried out, in both the reference range and the search range, the total sum values of pixel values are detected and the difference value of these total sum values is obtained, and only when the difference value is not less than a predetermined value, it is judged that an accurate matching process is carried out, and the search range is made to remain.

Like this, with respect to the search region 61 of the objective of the matching process, the process of determining the minimum search block bba or the process of removing the search region 61 of the objective of the process is ended, step b7 or step b8 proceeds to step b9. At step b9, with respect to all search regions 61 set in the overlapped region 22, it is judged whether a series of process operations of step b4 to step b8 is ended. If not, step b9 returns to step b4, and the above-mentioned process operation is applied to the next search region 61. When the template matching process is ended for all blocks, step b9 proceeds to step b10, and the process operation of the flowchart is ended.

Figure 13:
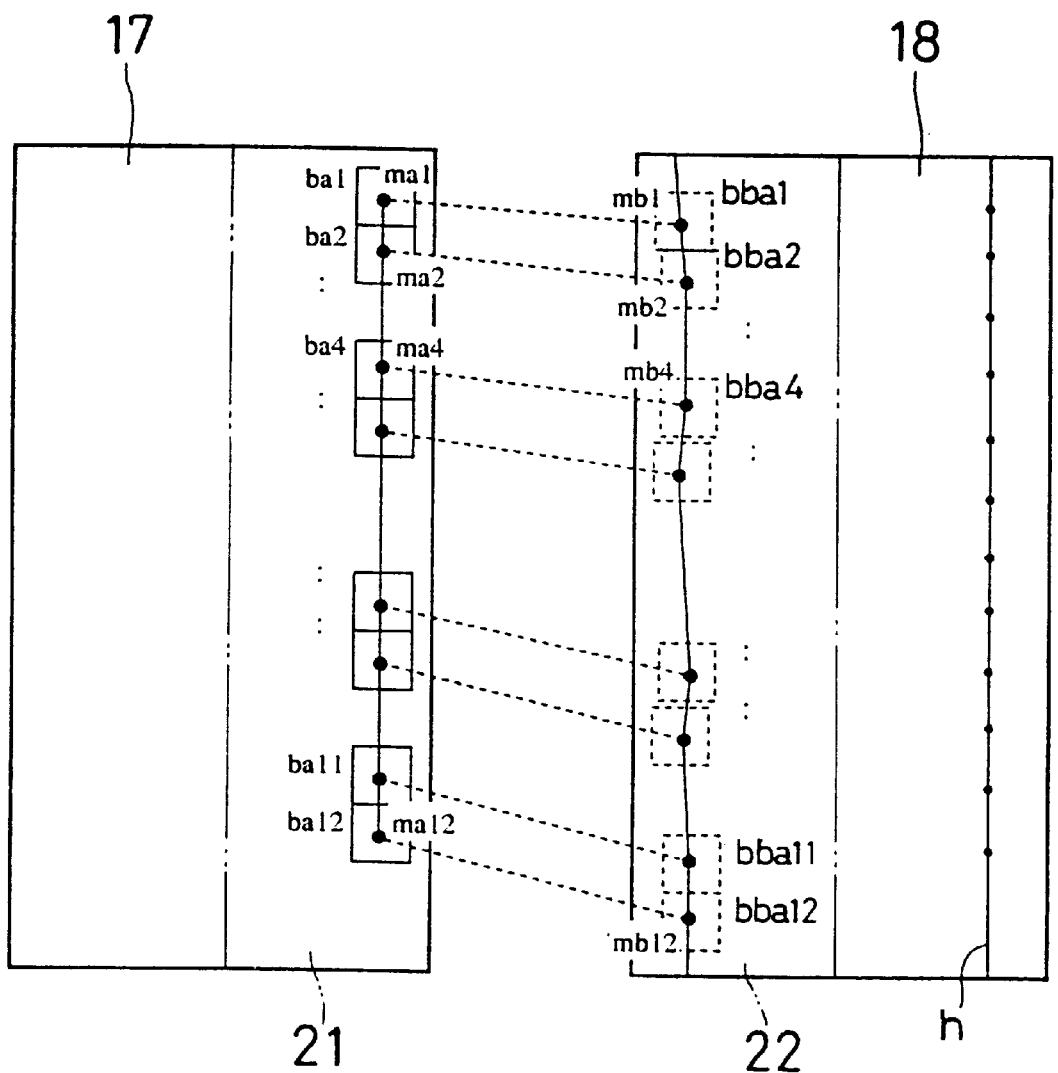
FIG. 13 is a schematic view showing the relation among reference blocks ba1 to ba12, and minimum search blocks bba1 to bba12 at the small block matching process.

FIG. 13 is a view showing the images-to-be-combined 17 and 18 after the small block matching process operation of FIG. 11 is applied to the images-to-be-combined 17 and 18 of FIG. 12

As compared with the image-to-be-combined 17 of FIG. 12, in this image-to-be-combined 17, among reference blocks ba, as blocks not meeting the condition of steps b4 and b6 of the flowchart, reference blocks ba3, ba6, ba7, and ba10 are deleted. Similarly, in the image-to-be-combined 18, the minimum search blocks bba3, bba6, bba7, and bba10 corresponding to the reference blocks ba3, ba6, ba7, and ba10 are deleted.

Although the center points ma1, ma2, ma4, ma5, ma8, ma9, ma11, and ma12 of the reference blocks ba1, ba2, ba4, ba5, ba8, ba9, ba11, and ba12 remaining in the image-to-be-combined 17 exist on the line segment z1 and its extension, a line segment for sequentially connecting the center points mb1, mb2, mb4, mb5, mb8, mb9, mb11, and mb12 of the minimum search blocks bba1, bba2, bba4, bba5, bba8, bba9, bba11, and bba12 remaining in the image-to-be-combined 18 becomes a polygonal line apart from the line segment z2 and its extension.

Next, the deformation process of images will be described below in detail. In the deformation process of image, when the images-to-be-combined 17 and 18 are superimposed, the image-to-be-combined 18 is geometrically transformed so that the center point mak of some remaining reference block bak is coincident with the center point mbk of the minimum search block bbak corresponding thereto. The value of k is any one of natural numbers 1, 2, 4, 5, 8, 9, 11, and 12.

In the deformation process, first, it is imagined that the images-to-be-combined 17 and 18 are superimposed. specifically, the images-to-be-combined 17 and 18 are superimposed such that the center point ma1 of the first reference block ba1 in the overlapped region 21 is coincident with the center point mb1 of the first minimum search block bba1 in the overlapped region 22, and the x-axes and y-axes of coordinates of the respective combination-subject-images 17 and 18 become in parallel with each other.

Figure 14:
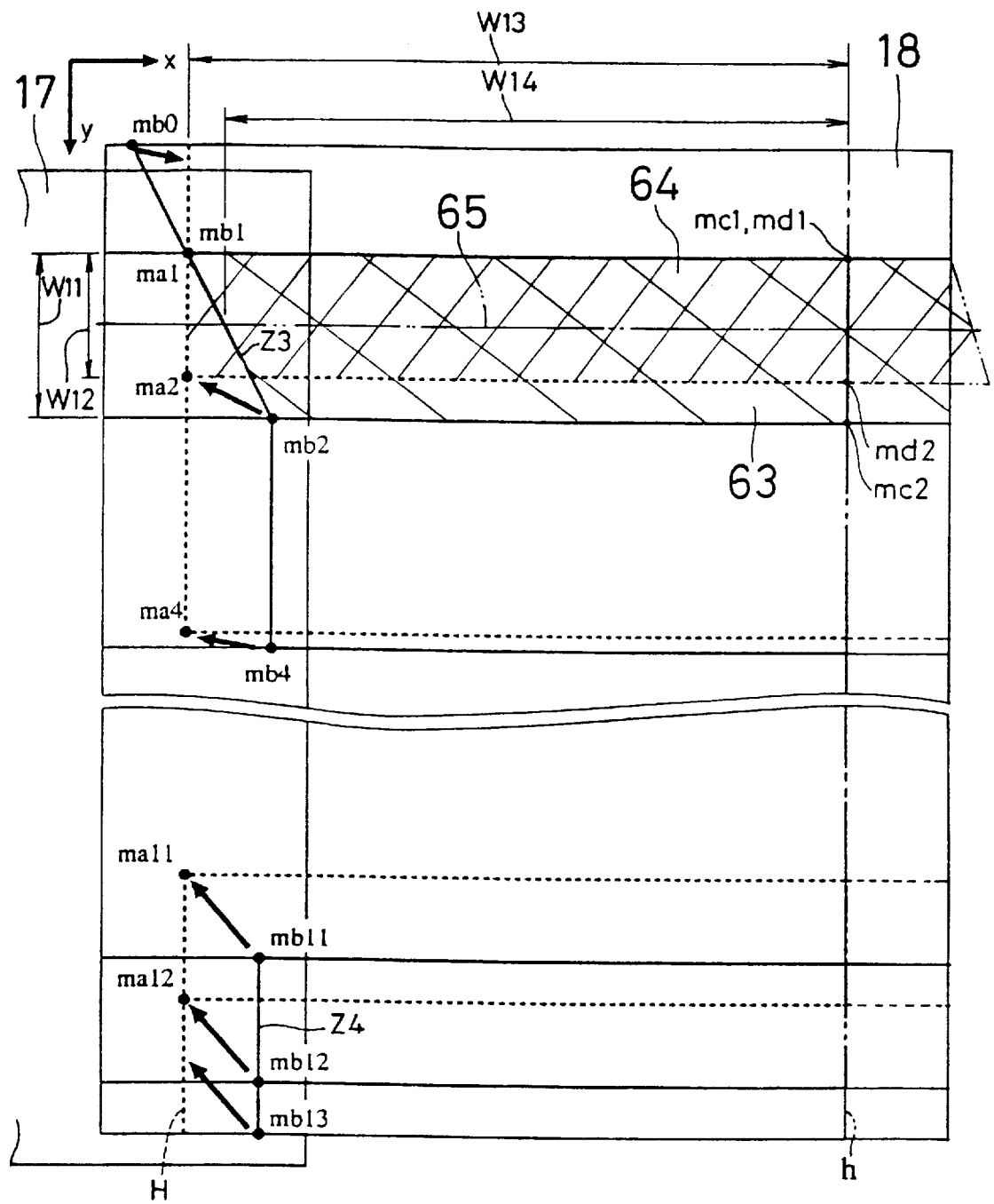
FIG. 14 is a schematic view of the images-to-be-combined 17 and 18 for explaining a deformation process of images.

FIG. 14 is a schematic view of the combination-subject-images 17 and 18 superimposed by the method described above. In the drawing, an intersection point between a straight line z3 passing through the center points mb1 and mb2 and a side of one end of the combination-subject-image 18 in the y-direction is made a point mb0. Similarly, an intersection point between a straight line z4 passing through the center points mb11 and mb12 and a side of the other end of the combination-subject-image 18 in the y-direction is made a point mb13.

From this state, the position coordinates of the representative point of each pixel of the combination-subject-image 18 are geometrically transformed in a unit of a trapezoid region defined by a pair of line segments passing through the center points mbk and mb(k+1) respectively and being in parallel with the x-axis of coordinates, and a line segment with both ends of the center points mbk and mb(k+1).

In the following, while a trapezoid region 63 is adopted as an example, the geometrical transformation method will be schematically described. In this geometrical transformation method, the trapezoid region 63 is deformed to be coincident with a rectangle region 64, and according to the deformation, position coordinates of each representative point are transformed.

The trapezoid region 63 includes the center points mb1 and mb2 as its vertexes, and a side passing through the points mb1 and mc1 is in parallel with a side passing through the points mb2 and mc2. Subsequently, a line segment and a side with certain two points as its ends, or a line segment and a side passing through certain two points will be denoted by continuously affixing reference numerals indicating the two points. The rectangular region 64 includes the center points ma1 and ma2 as its vertexes and sides passing through intersection points md1 and md2. The intersection points mc1, mc2; md1, md2 are intersection points between straight lines passing through the center points mb1, mb2; ma1, ma2 and being in parallel with the x-axis of coordinates, and a reference axis h being in parallel with a side of one end of the combination-subject-image 18 in the x-direction. The trapezoid region 63 and the rectangular region 64 are shown by oblique lines high on the right and low on the right in FIG. 14.

First, from FIG. 14, it is understood that the width W11 of the trapezoid region 63 in the y-direction is wider than the width W12 of the rectangular region 64 in they-direction. Thus, the trapezoid region 63 is compressed and deformed at a constant transformation ratio along the x-direction with respect to the y-direction. This transformation ratio is expressed by the following equation.

(transformation ratio in the y-direction)=W12/W11     (3)

By this, translation is made so that the sides mb1mc1 and mb2mc2 of the trapezoid region 63 coincide with the sides ma1md1 and ma2md2 of the rectangular region 64.

Moreover, from FIG. 14, it is understood that the side mb1mb2 of the trapezoid region 63 and the side ma1ma2 of the rectangular region 64 are different in length of a side and in angle to the y-axis of coordinates. Thus, with the reference axis h being in parallel with the y-axis of coordinates as the basis, the trapezoid region 63 is enlarged and deformed at a transformation ratio continuously changing along the y-direction, with respect to the x-direction. For example, the transformation ratio in the x-direction on an imaginary line 65 being in parallel with the x-axis of coordinates and passing through a portion between the center points ma1 and ma2 is expressed by the following equation.

(transformation ratio in the x-direction)=W13/W14     (4)

W13 denotes a distance between the reference axis h and the line segment with the center points mb1 and mb2 as its both ends. W14 denotes a distance between the reference axis h and the straight line z3 on the imaginary line 65. Like this, the transformation ratio of a region in the x-direction is determined for each imaginary line set at a predetermined interval shorter than the interval between the center points ma1 and ma2. By this, rotation and movement are made so that the sides mb1mb2 and mc1 mc2 of the trapezoid region 63 coincide with the sides ma1ma2 and md1md2 of the rectangular region 64.

Like this, when the trapezoid region 63 is deformed in trapezoid, the sides mb1mb2, mb1mc1, and mb2mc2 of the trapezoid region 63 after transformation coincide with the sides ma1ma2, ma1md1, and ma2md2 of the rectangular region 64. In FIG. 14, the right side of the trapezoid region 63 expands as shown by a phantom line. The coordinates of the representative point of each pixel in the trapezoid region 63 are transformed so that an interval between two adjacent representative points in the x- and y-directions is reduced or enlarged at the transformation ratio in the x- and y-directions. Thus, the position of each representative point in the x- and direction is sequentially moved by the amount of transformation of the interval.

Subsequently, a trapezoid region with another center point mb as its vertex is sequentially deformed by a similar method to the geometrical deformation method of the trapezoid region 63 described above. Specifically, the respective trapezoid regions are geometrically deformed so that the center point mbk coincides with the center point mak. Since points corresponding to the points mb0 and mb13 can not be determined in a trapezoid region containing the points mb0 and mb1 as its vertexes, and in a trapezoid region containing the points mb12 and mb13 as its vertexes, a transformation ratio in the y-direction can not be determined by the method described above. Thus, the transforming process is carried out on the assumption that the transformation ratio, in the y-direction, of the rectangular region containing the point mb0 and mb1 as its vertexes, and the trapezoid region containing the points mb12 and mb13 as its vertexes is equal to the transformation ratio, in the y-direction, of the trapezoid region 63 and the trapezoid region containing the points mb11 and mb12 as its vertexes.

The reference axis h may be set at any place as long as it is in the combination-subject-image 18 and is in a region in the direction going away from the overlapped region 22 beyond the center point mb. The reference axis h coincides with, for example, the side of one end of the combination-subject-image 18 at the side of the overlapped region 23. Further, it may coincide with the center axis of the combination-subject-image 18 in the x-direction. Moreover, it may coincide with an imaginary line passing through the center points of all reference blocks ba at the small block matching process when the combination-subject-images 18 and 19 are objective of the combining process.

When the reference axis is made coincident with the imaginary line passing through the center points of the reference blocks ba, in the geometrical transformation process of images, the transformation ratio of the image-to-be-combined 18 in the x-direction is determined on the basis of the distance between the reference axis h and the side ma1ma2, so that pixels on the reference axis h are linearly arranged on the same reference axis h even after the geometrical transformation. From this, it is understood that after image combining of the images-to-be-combined 17 and 18 is carried out, when image combining of the combined image and the image-to-be-combined 19 is carried out, the calculation process of the small block matching process in the process of the latter image combining becomes easy.

By such a method, the position coordinates of the representative point of each pixel of the image-to-be-combined 18 are transformed according to the image-to-be-combined 17. A superimposed image in which the image-to-be-combined 18 after transformation and the original image-to-be-combined are superimposed so that the center points ma and mb coincide with each other, is made a basis of a combined image. When the superimposed image is produced, a portion, in the image-to-be-combined 18, closer to the center of the image-to-be-combined 17 than the imaginary line passing through the center point mb of the image-to-be-combined 18, that is, a left portion to the imaginary line in FIG. 14 is cut off. The imaginary line is expressed by a thick solid line in FIG. 14 before image deformation, and coincides with a combining reference axis H after image deformation. This process is equivalent to deletion of pixel values of pixels constituting the part, in the image-to-be-combined signals of the image-to-be-combined 18. Thus, in the superimposed image, only the end at the center side of the image-to-be-combined 18 from the combining reference axis H passing through all the center points ma of the image-to-be-combined 17 overlaps with the end of the image-to-be-combined 18. Among superimposed images, a portion where the images-to-be-combined 17 and 18 superimpose with each other, will be hereinafter referred to as an overlapped portion.

The representative points of pixels constituting the superimposed image are often deviated from lattice points of the xy rectangular coordinate system set for the superimposed image. The combined image is equal to the superimposed image in the coordinate axis of the xy rectangular coordinate system, and is an image formed of pixels with the lattice points of the coordinate system as representative points. The pixel value of a pixel of the combined image is determined on the basis of the following determining method. The determining operation of the pixel value is carried out at the same time as the geometrical transformation operation of the image.

First, among all pixels of the combined image, it is assumed that the pixel values of representative points of remaining pixels other than the overlapped portion are equal to pixel values at lattice points in the superimposed image at the same position coordinates as the position coordinates of the representative points. For example, when the representative point of a pixel is coincident with the lattice point, the pixel value corresponding to this representative point is used as it is. When the lattice point does not coincide with the representative point of the superimposed image, the pixel value of the lattice point is interpolated and determined from pixel values of representative points of a plurality of pixels near the lattice point in the superimposed image by using a so-called linear interpolation method. In the linear interpolation method, a mean value of values obtained by multiplying pixel values of representative points of pixels at four points around the lattice point by a coefficient according to the distance between the lattice point and the respective representative points is made a pixel value of the lattice point.

The pixel value of the representative point of the pixel of the overlapped portion is determined by using the linear interpolation method from the weighted average value of pixel values of representative points of pixels of the superimposed image near the lattice point in the superimposed image at the same position coordinates as the position coordinates of the representative point. The coefficient value of the weighted average value is determined based on the fact to which of the images-to-be-combined 17 and 18 the pixel of the superimposed image originally belongs, and based on the distance between the representative point of the pixel and the combining reference axis H.

Figure 15:
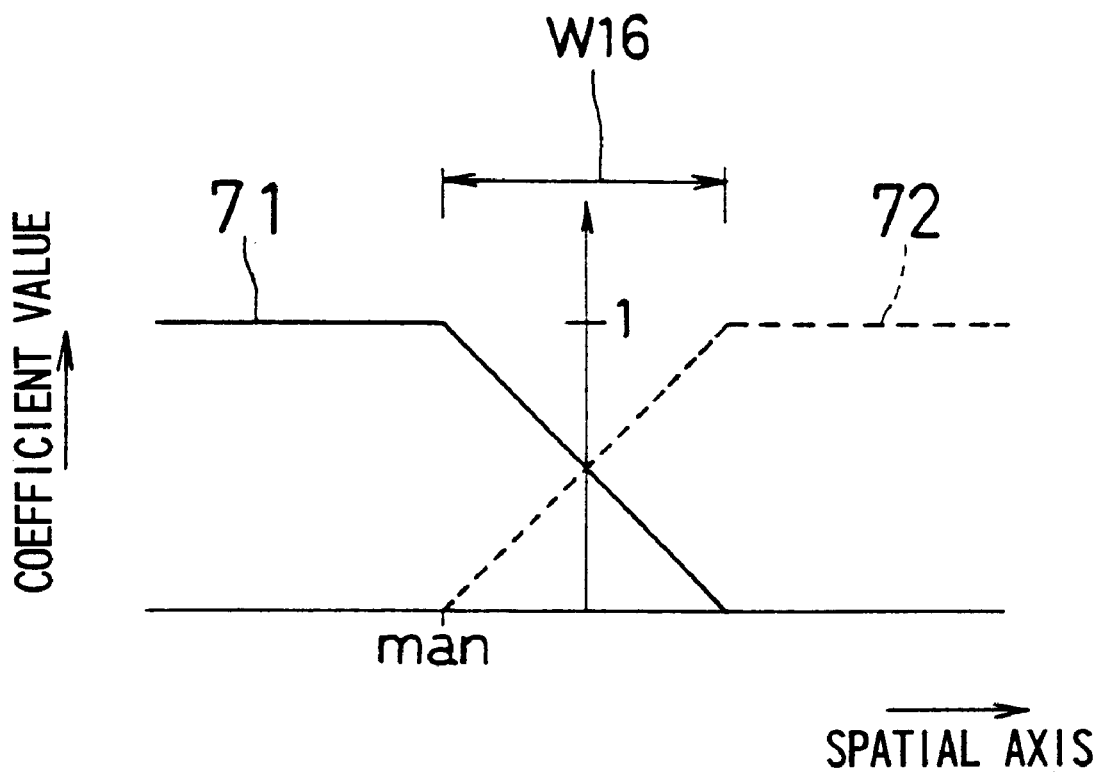
FIG. 15 is a graph showing the relation between a coefficient value of weighted average of pixel values and a spatial position of pixels in a combining process of images.

FIG. 15 is a graph showing the relation between the coefficient value of the weighted average value of the pixel values and the x-coordinate value of the superimposed image. It is assumed that the origin of the superimposed image and the combined image in the xy rectangular coordinate system coincides with, for example, the right upper vertex of the image, that is, the origin of the image-to-be-combined 17, and the x-coordinate value increases as it approaches the image-to-be-combined 18. The coefficient value is a value between a value of 0 and a value of 1 according to the x-coordinate value of the superimposed image.

The coefficient value of pixels belonging to the image-to-be-combined 17 is shown by a polygonal line 71. This coefficient value keeps a value of 1 between the origin and the combining reference axis H. The portion between these is a portion constituted by only pixels belonging to the image-to-be-combined 17 in the superimposed image, and the combining reference axis H is a boundary between the portion and the superimposed portion. The coefficient value becomes small as the position goes away from the combining reference axis in the direction where the x-coordinate value increases, and the coefficient value becomes a value of 0 at the point separate from the combining reference axis H by the predetermined distance W16. Even if the x-coordinate value is further increased, the coefficient value keeps a value of 0. The predetermined distance W16 is set smaller than the width of the overlapped portion in the x-direction, and for example, it is equal to the length in which 15 pixels of the superimposed image are arranged in the x-direction.

The pixel belonging to the image-to-be-combined 18 is shown by a polygonal line 72. This coefficient value keeps a value of 0 between the origin and the combining reference axis H. The coefficient value becomes large as the position goes away from the combining reference axis H in the direction where the x-coordinate value is increased, and the coefficient value becomes a value of 1 at the point separate from the combining reference axis H by the predetermined distance W16. Even if the x-coordinate value is further increased, the coefficient value keeps a value of 1. Since the absolute values of change rates of coefficient values near the combining reference axis H of the images-to-be-combined 17 and 18 are equal to each other, the coefficient values of the pixel values of the images-to-be-combined 17 and 18 at the point separate from the combining reference axis H by half of the distance W16 are equal to each other.

Thus, in the determining operation of pixel values of the superimposed portion, the linear interpolation is carried out by using a value obtained by multiplying the pixel values of each pixel of the superimposed portion by the coefficient value of the weighted average. By this, even when the luminance in the entire of the images of the subject in the images-to-be-combined 17 and 18 is different, the images can be combined so that the change in luminance is made smooth at the superimposed portion of the images.

By using the method as described above, the images-to-be-combined 17 and 18 can be combined. When the image-to-be-combined 19 is further combined with the images-to-be-combined 17 and 18, the combined image and the image-to-be-combined 19 are combined by the image combining method described above, so that the combined image in which the images-to-be-combined 17 to 19 are combined is obtained. As the image combining method of the images-to-be-combined 17 to 19, matching processes to the images-to-be-combined 17, 18; 18, 19 are individually carried out, and then, the image deformation process of the images-to-be-combined 17 to 19 may be carried out. In this image deformation process, image combining is made first for either one of the sets of the images-to-be-combined 17, 18; 18, 19, and the combined image is combined with the remaining image-to-be-combined. When the remaining image-to-be-combined and the combined image are combined, the deviation of position of the reference block ma in the image combining process is added, as an offset, to the positional relation between the center point ma of the reference block ba and the center point mb of the minimum search block bba at the small block matching process. By this, image combining can be made by the same image deformation method as the method described above.

By such an image combining operation, it is possible to obtain a combined image with the number of pixels larger than the image-to-be-combined. When the size of the pixel is made coincident with the pixel of the image-to-be-combined, the combined image becomes an image with a wider angle of view and a wider range than the image-to-be-combined. When the size of the image is made coincident with the image-to-be-combined, it becomes an image with higher resolution than the image-to-be-combined.

In the image synthesizing apparatus, although a gray scale image which is a white and black image is the image-to-be-combined, a color image may be used as the image-to-be-combined. At this time, as pixel values of an image combining method, for example, the value of a luminance signal for each pixel is calculated and is used. When the values of primary color signals indicating the luminance of primary colors light of red, blue and green are individually obtained for each pixel, only the value of either one primary color signal is made the pixel value, and the image combining method is carried out for only the primary color signal. The remaining primary color signals are transformed on the basis of the processing result of the image combining process of either one primary color signal. As the either one primary color signal, it is preferable to use a green primary color signal in which contribution to the luminance signal is maximum.

Further, in the image synthesizing apparatus of this embodiment, although three images-to-be-combined are used, the number of images-to-be-combined is not limited to this, but may be further increased. Although the arrangement of the images-to-be-combined is only in one direction, if each image-to-be-combined includes an overlapped region overlapping with at least an another image-to-be-combined, they may be arranged in matrix in two directions crossing at right angles. Further, if the image-to-be-combined includes an overlapped region with another image-to-be-combined, the original image may be used as it is. A one-dimensional image synthesizing unit for obtaining this image-to-be-combined is not limited to the video camera 28, but a copying machine or a scanner may be used. The image-to-be-combined may be an image which is inputted as image signals and is synthesized by a personal computer.

Further, the method of the image combining process is not limited, but another method may be used as long as the same result can be obtained. For example, the matching method of each block matching process may be a matching process other than the template matching process. The reference block and search block may have a shape other than a rectangular block.

INDUSTRIAL APPLICABILITY

According to the present invention, an image synthesizing apparatus combines a plurality of images-to-be-combined overlapping with each other and obtains a single combined image. In the image combining process operation, after the deviations of images of the subject in the respective images-to-be-combined are detected by two-step matching processes, movement of relative position and geometrical transformation of images are carried out to cancel the deviation for each of the images-to-be-combined, and the respective images-to-be-combined are combined. By this, it is possible to prevent deformation of the image of the subject in the combined image by accumulation of deviations of the images-to-be-combined. Since the matching process is carried out in two steps, the number of matching processes can be decreased.

Further, according to the invention, in the first matching means, first, in the first matching process, matching for obtaining relative positional deviations of the images of the subject near the center in the overlapped region of a pair of images-to-be-combined is obtained. Next, on the basis of the result of the first matching, in the second matching process, two pairs of reference regions and search regions are set, and matching for detecting detailed corresponding points in the images is obtained for each pair. By this, even when the state of deviation of images of the subject in a pair of images-to-be-combined is indefinite, the reference regions and search regions of the second matching process can be arranged at the optimum position for detecting the parallel deviation of images of the subject in the overlapped region. By using the two pairs of regions, the size and the deviation of rotation of the image of the subject of a pair of images-to-be-combined can be detected at the same time. Further, since the size of the reference region in the matching process is set so that the region at the second is smaller than the region at the first, rough detection of deviation of images and detection of detailed corresponding points in the images can be carried out respectively by an optimum method.

Further, according to the invention, the image synthesizing apparatus performs rotation transformation of representative points of pixels for each of adjacent set images-to-be-combined of matching objects during the process by the second matching means. By this, the overlapped region of the image-to-be-combined and its near portion can be combined so that the images of the subject are naturally connected in the image after combining.

Further, according to the invention, the second matching means uses a predetermined index, and uses only matching obtained in the search region in which the image of the subject is eligible as a comparative objective, to obtain a transformation amount of geometrical transformation. Further, according to the invention, the eligibility is determined by a difference value between total sum values of pixel values in the reference and search ranges, a difference value between the maximum value and minimum value of pixel values in the search region, and presence or absence of periodicity of the images of the subject. By this, it is possible to prevent distortion of images of the subject from being increased by carrying out a combining process with erroneous matching. Thus, it is possible to improve the picture quality of the combined image.

Further, according to the invention, at image combining, the respective images-to-be-combined are partially geometrically transformed into a trapezoid shape with a transformation reference axis as a basis. By this, especially when not less than three images-to-be-combined are combined, it is possible to prevent accumulation of deviations of images of the subject in the images-to-be-combined. Thus, the picture quality of combining images can be improved.

Further, according to the invention, since the reference region of the second matching process is set on the transformation reference axis, especially when not less than three images-to-be-combined are combined, it is possible to decrease a calculation process amount of combining process. Thus, the load of image combining means can be reduced.

Further, according to the invention, pixel values of pixels in a portion corresponding to the overlapped region of the image-to-be-combined in the combined image are obtained through weighted average of pixels in each overlapped region of a pair of images-to-be-combined. By this, even when the luminance of each of a plurality of images-to-be-combined is different from one another, it is possible to make a joint of combined images smooth. By this, the picture quality of the combined image can be improved.

What is claimed is:

1. An image synthesizing apparatus comprising:
   image-to-be-combined producing means for producing a plurality of signals of images-to-be-combined, the signals representing the images-to-be-combined including different portions of a subject, the means producing signals so that an image-to-be-combined including a portion of the subject and an adjacent image-to-be-combined including a portion adjacent to said portion of the subject have an overlapped region where a same portion of the subject is imaged in the images-to-be-combined;
   first matching means for making a check on matching of the images of the subject in the overlapped region for each set of adjacent images-to-be-combined among the image-to-be-combined signals produced by the image-to-be-combined producing means, and detecting a relative positional deviation between the overlapped regions on the basis of a result of the check on matching;
   second matching means for setting a plurality of reference regions of a predetermined size in the overlapped region of one of the images-to-be-combined whose relative positional deviation is detected by the first matching means, for setting a search region larger than the reference region for each of the reference regions in the overlapped region of the other of the images-to-be-combined on the basis of the relative positional deviation, for making a check on matching of the images of the subject between the reference region and the search region corresponding to the reference region, and for detecting a relative positional deviation between the images of the subject on the basis of a result of the check on matching; and
   image combining means for combining all the image-to-be-combined signals to superimpose the reference region and the search region corresponding to the reference region for each set of adjacent images-to-be-combined while partially deforming the respective images-to-be-combined to cancel the relative positional deviation detected by the second matching means, and producing combined image signals expressing a single combined image with respect to the subject.

2. The image synthesizing apparatus of claim 1, wherein the first matching means:
   firstly, sets a first reference region of a predetermined size at a predetermined position in an overlapping area of one of the set of the adjacent images-to-be-combined, making a check on matching of the images of the subject between the overlapped region of the other image-to-be-combined and the first reference region, and detects a relative positional deviation of the images of the subject on the basis of the obtained matching;
   next, sets at least two second reference regions smaller than the first reference region in parallel with the detected deviation direction in the one of the overlapped regions, and sets a second search region smaller than the overlapped region in the overlapped region of the other subject region for each of the second reference regions on the basis of the detected relative positional deviation; and
   makes a check on matching of the images of the subject between the second search region and the second reference region corresponding to the second search region, and detects the relative positional deviation between the overlapped regions on the basis of an obtained result of the check on matching.

3. The image synthesizing apparatus of claim 1, further comprising:
   rotation transformation means for obtaining a relative rotation angle between the adjacent images-to-be-combined for each set of the adjacent images-to-be-combined on the basis of the relative positional deviation between the overlapped regions detected by the first matching means, and for making rotation transformation of the image-to-be-combined signals so that the respective images-to-be-combined undergo relative angular displacement in the direction where the obtained relative rotation angle is cancelled,
   wherein the second matching means makes a check on matching of the search region for set of the images-to-be-combined in which the relative position is rotatively transformed by the rotation transformation means.

4. The image synthesizing means of claim 1, wherein the second matching means gives to the image synthesizing means only a result of the check on matching for the search region in which the image of the subject meets a predetermined index of eligibility as a comparative objective, among results of the check on matching obtained for the respective plurality of search regions.

5. The image synthesizing apparatus of claim 4, wherein the images-to-be-combined is constituted by a plurality of pixels,
   the reference region is equal to or larger than a single pixel in size,
   the result of the check on matching to the respective search regions is expressed in a position of the search range which is equal to the reference region in size and shape in the respective search regions, and in which a total sum value of pixel values expressing luminance of all pixels in the search range is closest to a total sum of pixel values of the reference region, and
   it indicates eligibility of the objectives as a comparative objective that a difference value between the total sum value of the pixel values in the search range of the check on matching and the total sum value of the pixel values of the reference region is less than a predetermined reference value.

6. The image synthesizing apparatus of claim 4, wherein each of the images-to-be-combined is constituted by a plurality of pixels,
   the reference region is equal to or larger than a single pixel in size;
   the result of the check on matching to the respective search regions is expressed in a position of a search range which is equal to the reference region in size and shape in the respective search regions, and in which a total sum value of pixel values expressing luminance of all pixels in the search range is closest to a total sum value of pixel values of the reference region, and it indicates eligibly of the objective as a comparative objective that a difference value between a maximum value and a minimum value among pixel values in the search range of the matching is not less than a predetermined reference value.

7. The image synthesizing apparatus of claim 4, wherein it indicates eligibility of the objectives as a comparative objective that in the images of the subject in the search region, portions with the same change in luminance and the same shape are not periodically repeated plural times.

8. The image synthesizing apparatus of claim 1, wherein the image-to-be-combined is formed of a plurality of pixels arranged in a matrix form along predetermined one and another direction, and in the geometrical transformation, for each of the images-to-be-combined, a distance between a predetermined transformation reference axis substantially in parallel with the one direction and each of the pixels is enlarged or reduced in the overlapped region, and a mutual distance in a pixel group composed of a plurality of pixels arranged linearly along the other direction is enlarged or reduced, so that a pixel arrangement is transformed.

9. The image synthesizing apparatus of claim 8, wherein the transformation reference axis passes through the centers of the respective reference regions of the second matching means.

10. The image synthesizing apparatus of claim 1, wherein the image-to-be-combined and the combined image are respectively composed of a plurality of pixels, and among all pixels of the combined image, a pixel value expressing luminance of each pixel of a portion corresponding to the overlapped region of the image-to-be-combined is a weighted average value obtained by attaching a weight, which is determined corresponding to a distance from a predetermined combining reference axis in the overlapped region, to a pixel value of each pixel of two overlapped regions of the image-to-be-combined corresponding to the pixel.

11. An image synthesizing method comprising the steps of:

producing a plurality of signals of images-to-be-combined, the signals representing the images-to-be-combined including different portions of a subject, so that an image-to-be-combined including a portion of the subject and an adjacent image-to-be-combined including a portion adjacent to said portion of the subject have an overlapped region where a same portion of the subject is imaged in the images-to-be-combined;

making a check on matching of the images of the subject in the overlapped region for each set of adjacent images-to-be-combined among the produced image-to-be-combined signals, and detecting a relative positional deviation between the overlapped regions on the basis of a result of the check on matching;

setting a plurality of reference regions of a predetermined size in the overlapped region of one of the images-to-be-combined whose relative positional deviation is detected, for setting a search region larger than the reference region for each of the reference regions in the overlapped region of the other of the images-to-be-combined on the basis of the relative positional deviation, for making a check on matching of the images of the subject between the reference region and the search region corresponding to the reference region, and for detecting a relative positional deviation between the images of the subject on the basis of a result of the check on matching; and combining all the image-to-be-combined signals to superimpose the reference region and the search region corresponding to the reference region for each set of adjacent images-to-be-combined while partially deforming the respective images-to-be-combined to cancel the detected relative positional deviation, and producing combined image signals expressing a single combined image with respect to the subject.

* * * * *